United States Patent
Mallory

(10) Patent No.: US 8,503,451 B2
(45) Date of Patent: *Aug. 6, 2013

(54) LIMITED AUTOMATIC REPEAT REQUEST PROTOCOL FOR FRAME-BASED COMMUNICATION CHANNELS

(75) Inventor: Tracy D Mallory, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 721 days.

This patent is subject to a terminal disclaimer.

(21) Appl. No.: 11/800,837

(22) Filed: May 8, 2007

(65) Prior Publication Data

US 2007/0263631 A1 Nov. 15, 2007

Related U.S. Application Data

(63) Continuation of application No. 09/955,385, filed on Sep. 18, 2001, now Pat. No. 7,236,494, which is a continuation of application No. 09/316,541, filed on May 21, 1999, now Pat. No. 6,335,933.

(51) Int. Cl.
*H04L 12/28* (2006.01)
*H04L 12/56* (2006.01)

(52) U.S. Cl.
CPC .................................... *H04L 47/34* (2013.01)
USPC ............................ 370/394; 370/473; 714/748

(58) Field of Classification Search
None
See application file for complete search history.

(56) References Cited

U.S. PATENT DOCUMENTS 4,439,859 A * 3/1984 Donnan ........................ 714/748
4,793,813 A * 12/1988 Bitzer et al. .................. 434/335

(Continued)

FOREIGN PATENT DOCUMENTS

| EP | 0794630 A2 | 9/1997 |
| EP | 1006689 A2 | 6/2000 |
| GB | 2229896 A * | 10/1990 |

OTHER PUBLICATIONS

Halsall, F., Data Communications, Computer Networks and Open Systems, 4.3 Continuous RQ; Fourth Edition; ISBN 0-201-42293-X, Addison-Wesley Publishing Company, published 1996, pp. 189-207.

*Primary Examiner* — Ayaz Sheikh
*Assistant Examiner* — Peter Chau
(74) *Attorney, Agent, or Firm* — McDermott Will & Emery LLP

(57) ABSTRACT

In a frame-switched network, a sender sends frames to a receiver over a possibly unreliable channel. Sent frames include frame identifiers that can be used for a limited automatic repeat request. Upon receipt of a frame, the receiver determines, from the frame identifier, if frames prior to the received frame were lost in transit. If the receiver determines that it missed a prior frame, the receiver sends the sender a negative acknowledgment (nack) for the missed prior frame or frames. Otherwise, if the receiver receives a frame correctly, it does not acknowledge the frame. The frame identifiers can be a set of sequential integers with frames transmitted in sequential frame order. In some embodiments, when a receiver receives a frame out of order, the receiver buffers the out of order frame in a receiver buffer for a receive buffer period until preceding frames are received or a receive buffer period expires. The sender can send a reminder frame to the receiver to allow the receiver to detect a missed prior frame missing from an end of a frame sequence. The channel between the sender and the receiver can be a bidirectional channel over a telephone wire, a cable, a radio frequency link or a power wire. Multiple logical channels might be set up between a given sender-receiver pair, to allow for traffic of varying priorities.

12 Claims, 12 Drawing Sheets

U.S. PATENT DOCUMENTS

| | | | | |
|---|---|---|---|---|
| 4,807,224 A * | 2/1989 | Naron et al. | | 370/218 |
| 4,829,524 A * | 5/1989 | Yoshida | | 714/748 |
| 4,866,707 A * | 9/1989 | Marshall et al. | | 714/749 |
| 4,888,800 A * | 12/1989 | Marshall et al. | | 380/281 |
| 4,933,969 A * | 6/1990 | Marshall et al. | | 713/177 |
| 4,970,714 A * | 11/1990 | Chen et al. | | 370/216 |
| 5,020,132 A * | 5/1991 | Nazarenk et al. | | 455/17 |
| 5,163,046 A * | 11/1992 | Hahne et al. | | 370/237 |
| 5,165,091 A * | 11/1992 | Lape et al. | | 370/216 |
| 5,168,497 A * | 12/1992 | Ozaki et al. | | 370/394 |
| 5,191,326 A * | 3/1993 | Montgomery | | 340/855.5 |
| 5,222,061 A | 6/1993 | Doshi et al. | | |
| 5,245,616 A * | 9/1993 | Olson | | 714/748 |
| 5,257,384 A * | 10/1993 | Farrand et al. | | 710/105 |
| 5,297,143 A | 3/1994 | Fridrich et al. | | |
| 5,331,318 A * | 7/1994 | Montgomery | | 340/855.4 |
| 5,371,783 A * | 12/1994 | Rose et al. | | 455/464 |
| 5,546,379 A * | 8/1996 | Thaweethai et al. | | 370/254 |
| 5,570,367 A * | 10/1996 | Ayanoglu et al. | | 370/346 |
| 5,577,024 A | 11/1996 | Malkamaki et al. | | |
| 5,590,133 A * | 12/1996 | Billstrom et al. | | 370/349 |
| 5,596,318 A * | 1/1997 | Mitchell | | 340/7.22 |
| 5,596,588 A * | 1/1997 | Nobutoki et al. | | 714/748 |
| 5,603,059 A * | 2/1997 | Churchill et al. | | 710/36 |
| 5,699,367 A * | 12/1997 | Haartsen | | 714/749 |
| 5,708,656 A * | 1/1998 | Noneman et al. | | 370/335 |
| 5,754,754 A * | 5/1998 | Dudley et al. | | 714/18 |
| 5,784,362 A | 7/1998 | Turina | | |
| 5,920,267 A * | 7/1999 | Tattersall et al. | | 370/258 |
| 5,931,916 A * | 8/1999 | Barker et al. | | 709/239 |
| 5,938,786 A * | 8/1999 | Gregg | | 714/748 |
| 5,983,382 A * | 11/1999 | Pauls | | 714/744 |
| 6,011,796 A * | 1/2000 | Rezaiifar et al. | | 370/394 |
| 6,021,124 A * | 2/2000 | Haartsen | | 370/336 |
| 6,249,681 B1 * | 6/2001 | Virtanen | | 455/466 |
| 6,301,249 B1 * | 10/2001 | Mansfield et al. | | 370/394 |
| 6,381,215 B1 * | 4/2002 | Hamilton et al. | | 370/236 |
| 6,424,632 B1 * | 7/2002 | Poret et al. | | 370/395.3 |
| 6,473,399 B1 | 10/2002 | Johansson et al. | | |
| 6,516,000 B1 * | 2/2003 | Kshirsagar et al. | | 370/410 |
| 6,611,515 B1 * | 8/2003 | Balachandran et al. | | 370/349 |
| 6,611,521 B1 * | 8/2003 | McKay et al. | | 370/392 |
| 6,621,796 B1 * | 9/2003 | Miklos | | 370/236 |
| 6,894,994 B1 * | 5/2005 | Grob et al. | | 370/335 |
| 7,236,494 B2 | 6/2007 | Mallory | | |
| 2002/0034182 A1 | 3/2002 | Mallory | | |
| 2003/0161301 A1* | 8/2003 | Sprague et al. | | 370/352 |

* cited by examiner

FIG. 5 (PRIOR ART)

| 6 BYTES | 6 BYTES | 2 BYTES | 0 - 1500 BYTES | 4 BYTES |
|---|---|---|---|---|
| DESTINATION MAC ADDRESS | SOURCE MAC ADDRESS | TYPE/ LENGTH | ETHERNET PAYLOAD | FCS (CRC - 32) |

FIG. 6

| 6 BYTES | 6 BYTES | 8 BYTES | 2 BYTES | 0 - 1500 BYTES (OR LESS IF PHYSICAL LAYER CANNOT SUPPORT EXTRA BYTES) | 4 BYTES |
|---|---|---|---|---|---|
| DESTINATION MAC ADDRESS | SOURCE MAC ADDRESS | LARQ HEADER | TYPE/ LENGTH | ETHERNET PAYLOAD | FCS (CRC - 32) |

| ETHERTYPE | SUBTYPE | LEN | LARQ VER. | RSV | NACK | CTL | PRI | RSV | SEQ# |
|---|---|---|---|---|---|---|---|---|---|
| 0x886C | 0x10 | XXXX XXXX | XXXX XXXX | 0 | XXX | 0 | XXX | 0x00 | XXXX XXXX |
| 16 BITS | 8 BITS | 8 BITS | 8 BITS | 1 BIT | 3 BITS | 1 BIT | 3 BITS | 8 BITS | 8 BITS |

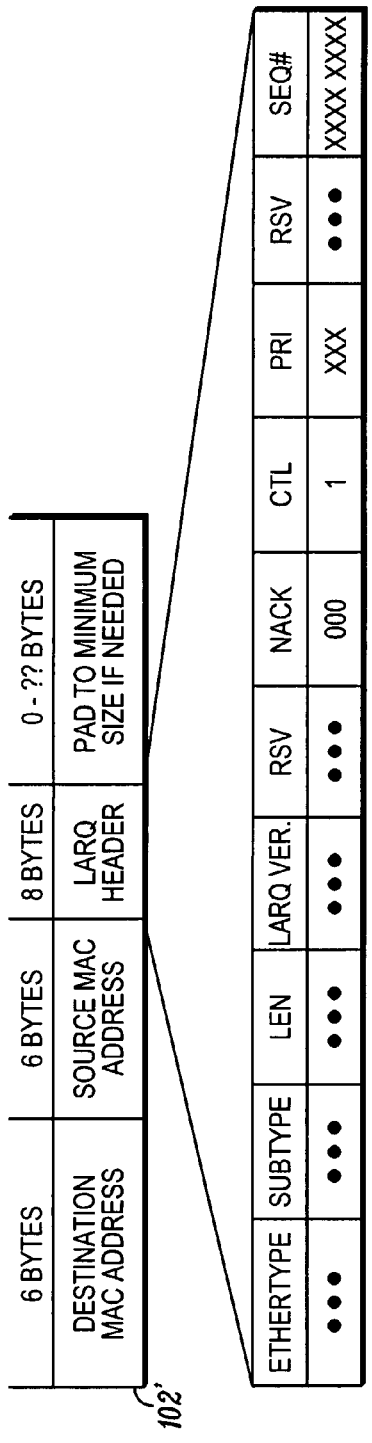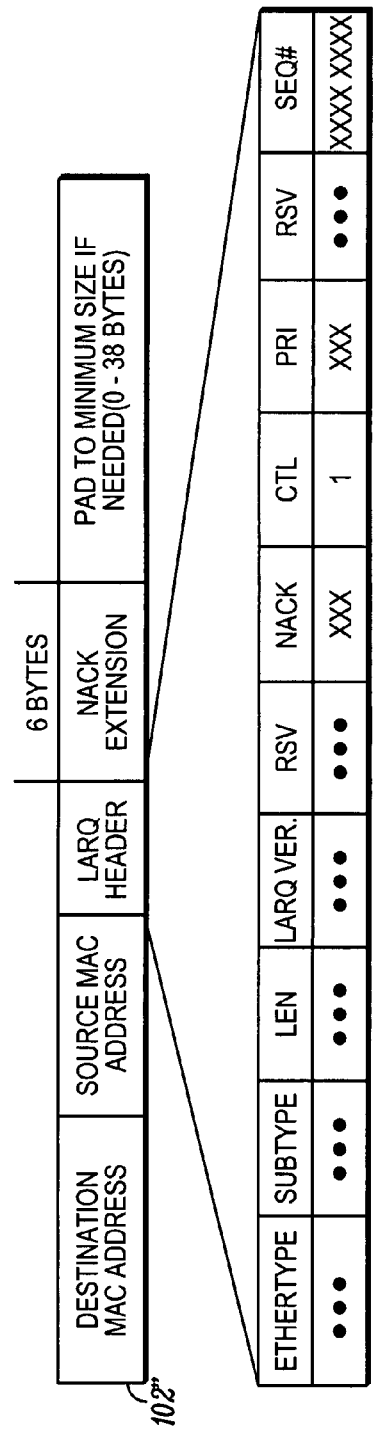

FIG. 9(a)

CHANNEL STATE INFORMATION TABLE

| SENDER ID | DESTINATION ID | PRI | CHANNEL TYPE | CUR SEQ | OLDEST SEQ | FRAME TABLE |
|---|---|---|---|---|---|---|
| 2.0.7.0.0.3 | FF.FF.FF.FF.FF.FF | 1 | SENDER | 34 | 34 | |
| 2.0.7.0.0.3 | 3.0.4.0.3A.77 | 1 | SENDER | 131 | 120 | |
| 3.0.4.0.3A.77 | 2.0.7.0.0.3 | 1 | RECEIVER | 78 | 78 | |
| ... | | | | | | |

SENDER FRAME STATE TABLE

| SEQ# | FRAME POINTER | SEND TIME | RETRANSMIT TIME |
|---|---|---|---|
| 17 | XXX | 10:23:27:222 | -:- |
| 18 | XXX | 10:23:27:223 | -:- |
| 19 | XXX | 10:23:27:240 | 10:23:27:250 |
| 20 | XXX | 10:23:27:245 | |
| 21 | XXX | 10:23:27:258 | |
| ... | | | |

FIG. 9(c)

RECEIVER FRAME STATE TABLE

| SEQ# | FRAME POINTER | MISS TIME | NACK REQ TIME | RECEIVE TIME |
|---|---|---|---|---|
| 17 | XXX | -:- | | 10:23:27:223 |
| 18 | XXX | -:- | | 10:23:27:223 |
| 19 | XXX | -:- | | 10:23:27:251 |
| 20 | XXX | 10:23:27:245 | 10:23:27:45 | 10:23:27:245 |
| 21 | XXX | -:- | | 10:23:27:259 |
| ... | | | | |

LIMITED AUTOMATIC REPEAT REQUEST PROTOCOL FOR FRAME-BASED COMMUNICATION CHANNELS

This is a Continuation Application of patent application Ser. No. 09/955,385 filed Sep. 18, 2001 now U.S. Pat. No. 7,236,494, which is a continuation of application Ser. No. 09/316,541 filed on May 21, 1999, now U.S. Pat. No. 6,335,933, also incorporated herein by reference. The present invention relates to communications systems in general and, more specifically, to methods and apparatus for reducing data loss on a network with an unreliable physical layer.

BACKGROUND OF THE INVENTION

Many frame-handling schemes and protocols have been used for data transport. In systems implementing those schemes and protocols, data is "packaged" into frames and sent from a sender to a receiver (or to a plurality of receivers in a broadcast mode). When the receiver receives a frame, it unpackages the data and uses it. In the standardized ISO seven-layer network, a transmitting application moves data to a receiving application by providing the data to a layer below an application layer, which in turn provides it to the next lower layer, until the data reaches the physical layer and is sent to the receiver. At the receiver, the process is reversed, with the data flowing up from the receiver's physical layer to its application layer. The seven layers, from the bottom to top are: 1) the physical layer, 2) the link layer, 3) the network layer, 4) the transport layer, 5) the session layer, 6) the presentation layer, and 7) the application layer. FIG. 1 illustrates this concept.

Much has been written on the benefits of such an arrangement of layers and need not be recounted here. Many standards for data communications between peer layers have also been proposed and are in common use. The most common form of networked communication in a local area network in use today is Ethernet/IEEE-802.3 network protocol communication ("Ethernet" for short). Because of its ubiquity, many Ethernet components are readily available at low cost. For example, single chips are readily available that perform much of the logic needed to implement Ethernet communications. Furthermore, because of their ubiquity, those chips have been widely tested and the technology is mature to the point where its usefulness and limitations are well known, in addition to being readily available.

The Ethernet link layer was designed to be supported by a relatively reliable physical layer below the link layer. Because of this, the Ethernet link layer, in its standard operating mode, does not correct errors in frames nor does it retransmit lost frames. A number of reliable physical layers have been standardized for Ethernet, including ones based on coaxial cables, high quality twisted pair, and optical fibers. These generally deliver very low error rates (e.g. less than 1 errored frame per million frames sent). Consequently, many higher layer protocols have been designed with low error rates in mind and perform poorly at higher rates. For example, streaming video applications require low error rates, as the loss of 1 frame or more in 1,000 frames can cause visible errors. As another example, the Transport Control Protocol (TCP), which is used for virtually all wide area (Internet) reliable transport, performs poorly when more than 1 frame in 20 is lost. If an unreliable physical layer were used with standard Ethernet link layer, higher layer protocols would have more lost frames.

With the growth of home networking, more and more computer users are expecting to be able to connect their home computers and other home appliances together. With the ready availability of inexpensive Ethernet components, the computer users might like to set up an Ethernet network for the interconnected home devices. However, unless the house is wired with standardized media such as CAT 5 twisted pair cables or the like, the network must be set up over existing wiring, which usually means either phone lines or power lines (unless the network is wireless). While phone lines and power lines can easily carry lower bit rate data streams, transmitting data at Ethernet rates is challenging, since neither phone lines nor power lines were designed to carry high bandwidth communications. The typical phone line is a set of twisted pairs terminated in RJ-11 sockets with no matching termination resistors and could be daisy-chained from phone jack to phone jack with many branches further degrading the lines and adding noise onto the lines. Power lines have their own set of problems with the power grid and appliances injecting noise onto the wires.

The unreliability of these lines at high bandwidths results in frame loss or delay. Where the noise or other impairments on a line cause the receiver to make even a single error in decoding a frame's data, that frame is lost. Loss of frames results in loss of data or delay due to retransmission of the lost data. For time sensitive applications, delay may pose a significant problem. For other applications, such as UDP-based multicast of audio/video streams, frequent lost frames are a problem.

Attempts to increase the reliability of an unreliable channel generally fall into two categories: using error-correcting codes (forward error correction) or using a reliable data stream protocol. Error correcting codes require that extra data be sent, using up extra channel capacity for all traffic and extra computational resources in the sender even when there are no errors. Even with strong error correcting codes, frames may still be lost because the frame is too badly damaged or is simply lost because of errors at the beginning or end of the frame. Therefore, extra effort will be expended computing and transporting extra bits that will either not be used, in the case of undamaged frames, or cannot be used, in the case of badly damaged frames.

Reliable data stream protocols, such as HDLC LAPB, provide a reliable data channel over an unreliable medium by having the receiver acknowledge receipt of frames and having the sender retransmit frames that are not acknowledged. A reliable data stream protocol is used to ensure that all frames are successfully received without regard to timeliness, and thus the protocol requires relatively frequent acknowledgments to be sent from the receiver to the sender, as well as flow control to halt the flow of data. These protocols also require explicit connection establishment between pairs of stations (a sender and a receiver) and do not support multicast applications. The above factors require extra bandwidth, may introduce delay and make the network less robust. For these reasons, the use of reliable data stream protocols has limitations as a method to increase reliability.

Therefore, a protocol and supporting methods and apparatus are needed that can reduce effective frame loss rates and delays to the level of standard Ethernet frame loss rates and delays, over a physical layer that is expected to be unreliable, and while doing so at minimal cost in terms of network bandwidth and host resources, and while preserving the connectionless, low-latency, and multicast service normally expected of Ethernet.

SUMMARY OF THE INVENTION

In a frame-switched network according to one embodiment of the present invention, a sender sends frames to a receiver over a possibly unreliable channel. A sent frame includes a frame identifier selected from a set of reusable frame identifiers. The sender stores the frame in a frame buffer for a buffer period. Upon receipt of the frame, the receiver determines, from the frame identifier, if frames prior to the received frame were lost in transit. If the receiver determines that it missed a prior frame, the receiver sends the sender a negative acknowledgment (nack) for the missed prior frame or frames. If the sender receives a nack, the sender determines the frame identifier(s) of the missed prior frame(s) and resends the missed frame(s) if the missed frame(s) is (are) in the frame buffer. At the end of a buffer period, the sender releases the transmitted frame from the frame buffer.

In some specific embodiments, the sender transmits the transmitted frame to more than one receiver, such as in a multicast or broadcast mode. The frame identifiers can be a set of sequential integers with frames transmitted in sequential frame order. In some embodiments, when a receiver receives a frame out of order, the receiver buffers the out of order frame in a receiver buffer for a receive buffer period until preceding frames are received or the receive buffer period expires.

In some embodiments, the sender sends a reminder frame to the receiver to allow the receiver to detect a missed prior frame missing from an end of a frame sequence. The channel between the sender and the receiver can be a bidirectional channel over a telephone wire, a cable, a radio frequency link or a power wire. Multiple logical channels might be set up between a given sender-receiver pair, to allow for traffic of varying priorities.

One advantage of the present invention is that new data can be transmitted between a sender and a receiver without the sender having to confirm that older data was sent and received correctly, while still providing a window of opportunity for frames to be quickly resent. The window of opportunity advances as new frames are sent. As a result of the advancing window, some frames may be lost, but the protocol is designed such that those lost frames will be handled at a higher layer. No flow control is required at the sender end, therefore no channel setup or receiver flow control setup is required.

A further understanding of the nature and advantages of the inventions herein may be realized by reference to the remaining portions of the specification and the attached drawings.

BRIEF DESCRIPTION OF THE DRAWINGS

FIG. 5 is frame map showing the fields of a conventional Ethernet frame.

FIG. 6 is a frame map showing the fields of a LARQ data frame and its LARQ header.

FIG. 7 is a frame map showing the fields of a LARQ reminder control frame and its LARQ header.

FIG. 8 is a frame map showing the fields of a LARQ nack control frame and its LARQ header.

FIG. 9 is an illustration of examples of some tables used by a LARQ handler, with FIG. 9(a) showing a channel state information table,
FIG. 9(b) showing a sender frame state table and
FIG. 9(c) showing a receiver frame state table.

DESCRIPTION OF THE SPECIFIC EMBODIMENTS

Several embodiments are described herein for implementing a protocol referred to herein as the "LARQ" protocol (for Limited Automatic Repeat reQuest). As will be apparent upon reading this description, the LARQ protocol reduces the effective error rate of an unreliable frame-based communication channel or network. Unlike most sequence number-based protocols, LARQ does not attempt to guarantee reliable delivery of every frame, but instead attempts to cover up some losses in the physical layer through fast retransmission of lost frames and leaves the reliable delivery of every frame to the higher network layers. This significantly enhances the usability of networks that may, at least occasionally, have loss rates of one in a hundred frames or worse, and provides this enhancement with minimal additional complexity at the lower network layers.

One such application for the LARQ protocol is where methods used for highly reliable channels are adapted for unreliable channels. For example, LARQ protocols can be used for implementing an Ethernet network (which usually runs on reliable channels such as a coaxial cable dedicated to Ethernet) over telephone lines or power lines that are also used for analog telephone service or AC power distribution.

Figure 1:
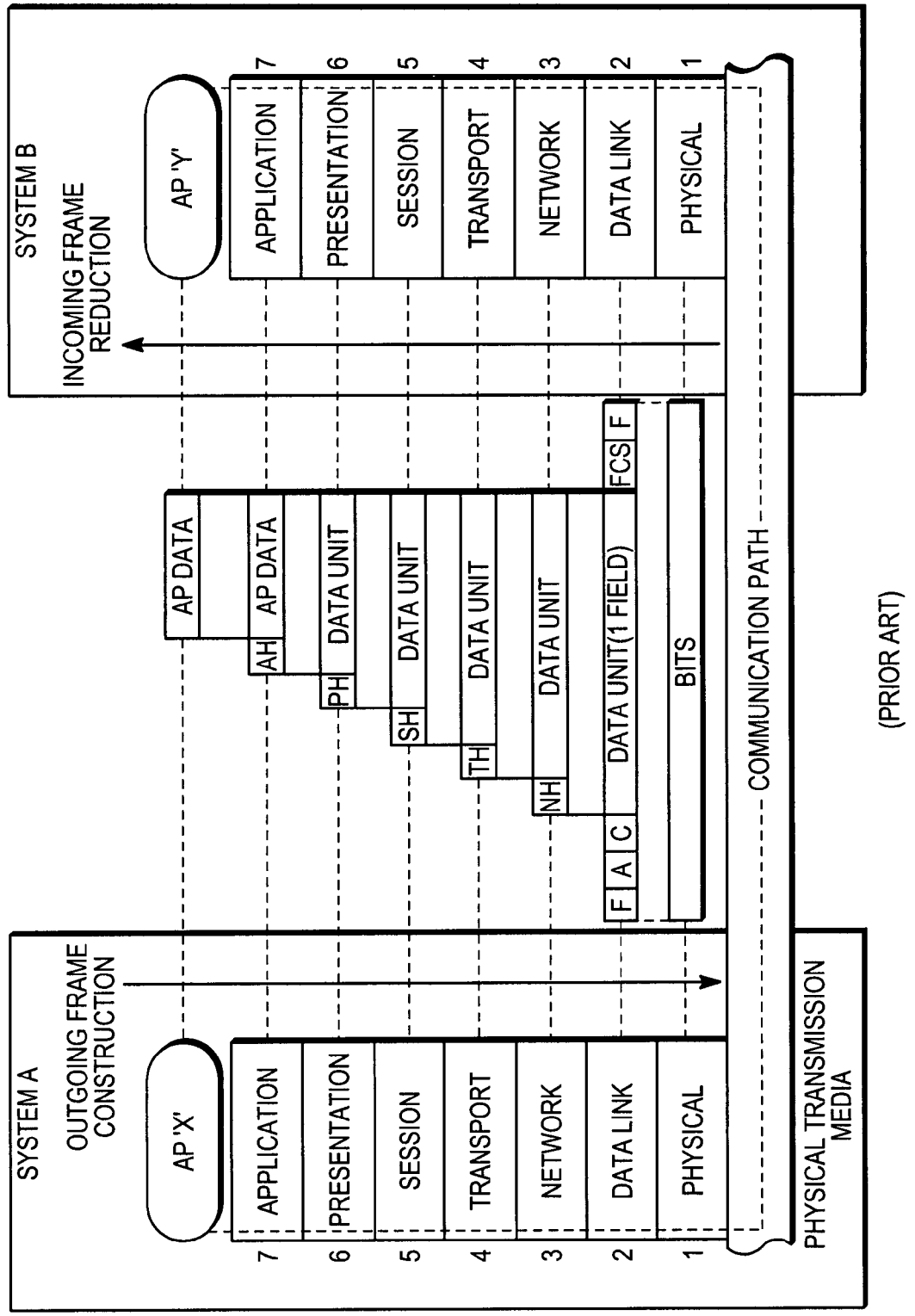
FIG. 1 is a diagram illustrating the standard seven-layer network stack.

FIG. 1 illustrates the basic structure of a network stack between two computing or communications systems. In the ISO view of networking, an application (AP "X") on one system (System A) communicates application data to an application (AP "Y") on another system (System B). While the communication between the applications appears to the applications to be peer-to-peer communication, it is in fact communication with the next lower network layer, in this case the presentation layer. As data is passed down through each layer on system A, that layer encapsulates the data. Once the data reaches the lowest layer, the physical layer, it is transmitted to system B and then the data works its way up the layers at system B, being stripped of encapsulation at each layer.

Figure 2:
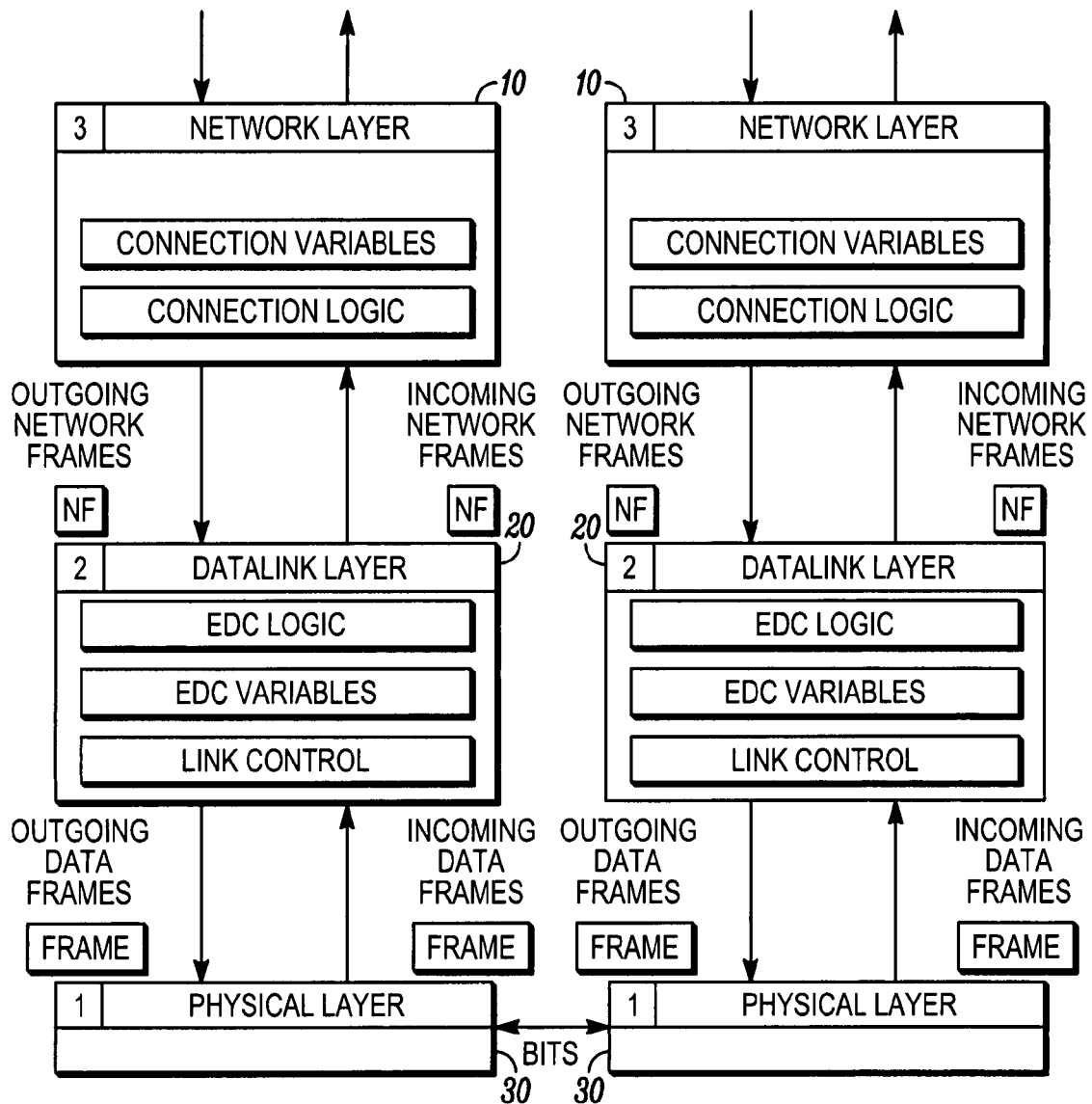
FIG. 2 is a block diagram showing the standard data flow in the lower three layers of a network stack.

Referring now to FIG. 2, the lower three layers of the network stack are shown in greater detail. As is well-known, data passes to the sender's network layer 10, which forms network frames and passes the network frames to a data link layer 20, which in turn forms data frames from those network frames and sends those data frames to a physical layer 30. It should be understood that these layers are typically implemented as a combination of logic and storage that is configured to carry out the task of the layer. The logic can either be in the form of hardware, software, firmware or a combination of those. As is well-known, mass-produced and/or high-speed implementations are generally done in dedicated hardware, while custom, special-purpose and/or low cost implementations might be done in software or firmware, with a general purpose processor executing instructions to carry out the tasks of the layer. A layer might also be implemented, at least in part, using programmable gate arrays, or the like. More than one layer might be combined into an integrated circuit or software design. It should be apparent, upon review of this description, that there are many ways to implement the inventions described herein, using combinations of conventional circuit elements and/or software techniques.

Figure 3:
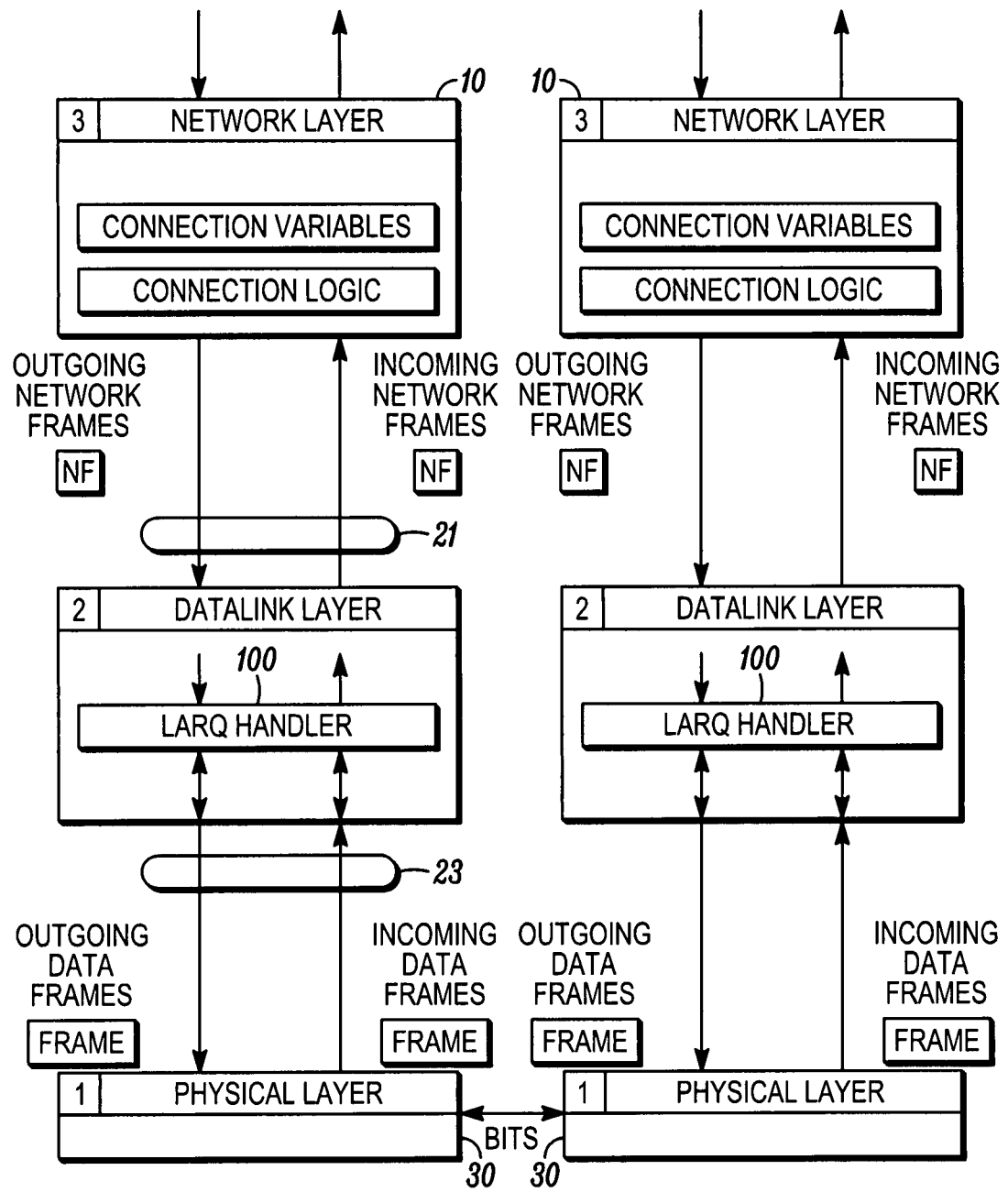
FIG. 3 is a block diagram showing a data flow according to one embodiment of the present invention.

FIG. 3 illustrates how the networking model of FIG. 2 is modified to handle the LARQ protocol. As shown in FIG. 3, a LARQ handler 100 is included within the data link layer 20. For data transmission, LARQ handler 100 accepts data frames from an upper interface 21 of the data link layer 20 and outputs LARQ frames 102 to a lower interface 23 of link layer 20 (usually implemented within hardware under control of a software driver). For data reception, LARQ handler 100 accepts LARQ frames from the lower portion of the link layer and outputs data frames to upper interface 21. As explained below, some embodiments of LARQ handler 100 can send LARQ and "non-LARQ" (i.e., conventional) frames as well as receive LARQ and "non-LARQ" frames, albeit with the non-LARQ frames not fully benefiting from the advantages of LARQ protocols. It should be understood from FIG. 3 that the data link layer might include additional processing elements between LARQ handler 100 and either or both of the interfaces to adjacent layers.

Figure 4:
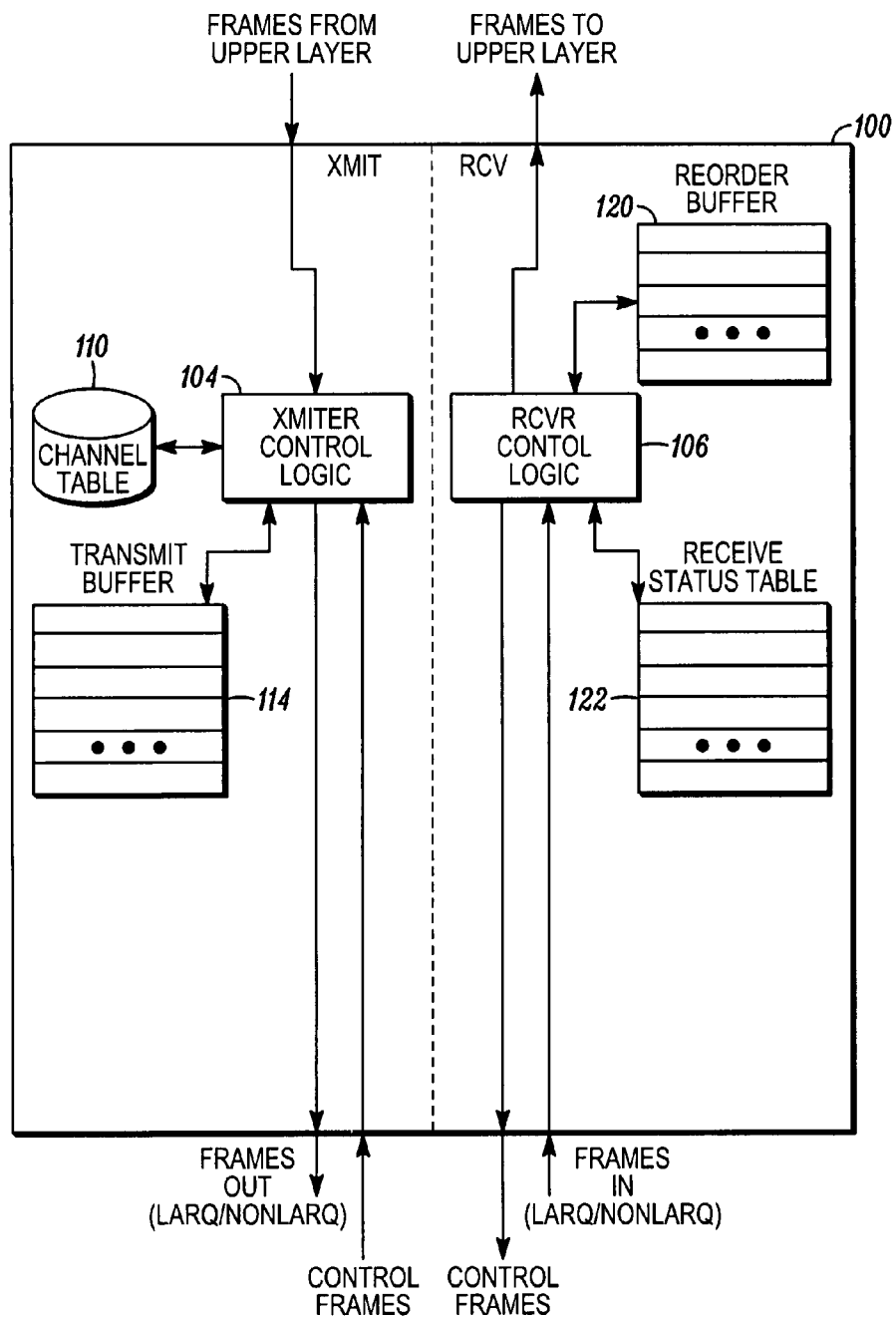
FIG. 4 is a block diagram of sender and receiver circuitry for one station communicating using a LARQ (Limited Automatic Repeat reQuest) protocol according to one embodiment of the present invention.

FIG. 4 is a block diagram of one circuit for implementing LARQ handler 100. Typically, the LARQ layer is a sub-layer within layer 2 (data link layer) in the ISO network structure. As illustrated in FIG. 4, LARQ handler 100 includes sender control logic 104 and receiver control logic 106. Sender control logic 104 handles the input of frames from the upper layer, the output of data frames to the lower layer and the input of control frames from the lower layer, as well as other control functions described herein. Sender control logic 104 also controls a channel table 110 and a transmit buffer 114, which are described in more detail below. Receiver control logic 106 handles the inverse of those functions, such as the output of frames to the upper layer, the input of data frames from the lower layer and the output of control frames to the lower layer, as well as other functions described herein and also controls a reorder buffer 120 and a receive status table 122, which are also described in more detail below.

Only one LARQ handler 100 is shown in FIG. 4, but it should be understood that one LARQ handler 100 would be provided at each LARQ-capable node on the network. Furthermore, it should be understood from FIG. 4 that the receive side and the transmit side of one LARQ handler 100 typically communicate with other transmit sides and receive sides more often than they communicate among themselves. It should also be understood that the functionality of the receive side and the transmit side might be less separated than is shown in FIG. 4. One reason for showing the separation of the two sides is to aid in the understanding of the operation of LARQ handler 100. In an actual implementation, design and processing efficiency might combine elements. For example, as explained below, channel table 110 might contain information for both the transmit side and the receive side.

In the preferred embodiment, a network using LARQ protocols operates according to a modification of the Ethernet protocol. This allows the use of the many standard tools and components that have already been developed and are easily available for use with the Ethernet protocol. In the Ethernet protocol, an Ethernet frame passed between a data link layer and a physical layer has the structure shown in FIG. 5.

The frame shown in FIG. 5 is a standard Ethernet/IEEE-802.3 MAC (Media Access Control) frame and header with 48-bit addressing. The frame includes a six byte (48-bit) destination MAC address, a six byte source MAC address, a two byte type/length field, followed by a payload and a four byte FCS (Frame Check Sequence). The payload is the data being carried by the frame and can be from 0 bytes to 1500 bytes long.

FIG. 6 shows the structure of a LARQ data frame 102, as might be passed between a LARQ layer and a physical layer. As shown there, LARQ data frame 102 is a modified Ethernet frame and comprises destination and source address fields, a LARQ header field, a type/length field, a payload field (that contains the data being transmitted) and possibly an FCS field. A typical LARQ header comprises the fields shown in Table 1. Note that not all of the fields in Table 1 are required, so a LARQ header could be as small as, or smaller than, eight bytes or as large as fourteen bytes. In the various descriptions of LARQ frames, a minimum size of eight bytes is assumed for a LARQ header.

TABLE 1

LARQ HEADER FIELDS

| Label | Name | Size (bits) | User/Description |
|---|---|---|---|
| Ethertype | Ethertype | 16 | Assigned to Epigram by the IEEE |
| Subtype | Subtype | 8 | Assigned to LARQ by Epigram (sample value: 0x10) |
| Len | Length | 8 | Additional length of LARQ header (either 4 or 10 bytes for a total length of 8 or 14 bytes) |
| LARQ Ver. | LARQ Version | 8 | Indicates the version of LARQ used by the frame originator. |
| Rsv | Reserved | 1 | Reserved for further use. Currently set to 0 by the sender and ignored by the receiver. |
| Nack | Nack Indication/Count | 3 | Nack = 000: No Nack<br>Nack = 001: Nack one sequence number<br>Nack = 010-111: Sequence of 2 to 7 Nacks<br>If Nack is not 000, Ctl must be 1. |
| Ctl | Control Bit | 1 | Ctl = 0 signals a frame that carries a standard Ethernet payload following the LARQ header.<br>Ctl = 1 signals a control frame with no payload. |
| Pri | Frame Priority | 3 | Indicates the priority level of the frame. |
| Rsv | Reserved | 8 | Reserved for future use; makes for an 8 byte header |
| Seq # | Sequence Number | 8 | Incremented by one, modulo 256, for every new data frame. |

A receiver can distinguish a LARQ frame from a non-LARQ frame by the Ethertype of the frame since the Ethertype of a non-LARQ frame would fall in the same place in a frame as in a LARQ frame. In the examples set out here, an Ethertype of 0x886c is used to designate LARQ frames. That 32-bit value has been assigned to Epigram, the assignee of the present application, by the IEEE, the entity that assigns Ethertypes. An Ethertype value can be distinguished from length values because valid lengths must be less than 0x0600, while valid Ethertypes are greater than 0x0600. Other protocols are supported for the single Ethertype by using different subtypes to signal the use of a different protocol.

The FCS field is usually not present on the frames passed between the upper and lower interface portions of the data link layer, as most implementations of the MAC layer are in hardware and handle the FCS directly, adding and stripping it transparently. With the FCS, the total size of the frame is 1518 bytes. If there is an error in the received FCS, the frame will be dropped. If a LARQ handler is tightly embedded, it may have access to frames with bad FCS values before the frames are dropped, allowing for faster retransmission in some cases.

When a frame is received with Nack set to other than 000, it indicates a request for retransmission. The nonzero value of Nack indicates how many frames are being "nacked" (up to seven). With this scheme, the Nack frame can only nack sequential frames. Thus, if Nack=001, then the Sequence Number field indicates the missed/lost frame, whereas if Nack=011, then the three frames starting with the indicated sequence number are being nacked. For multiple, nonsequential frames, multiple Nack frames would be sent, in the preferred embodiment.

If there is bidirectional data flow, the nacks could be inserted into frames traveling from the "nacking" receiver to the sender, although the described implementation does not do so. If the data flow is unidirectional, the nacks would be sent in control frames (i.e., Ctl=1). If more than one frame in a sequence is lost, one nack can signal the loss of up to seven sequential frames, by setting the Nack field to the number of lost frames.

If Nack=000 but Ctl=1, then the frame is a "reminder" frame from the sender to the receiver. In a reminder frame, the sequence number is set to the sequence number of the most recently sent data frame, in case receiver missed it. Otherwise, if the receiver completely lost that last sent frame, it might never nack that lost frame, since the typical event that alerts the receiver to the loss of a frame is the receipt of a frame from later in the sequence.

The sequence field contains an eight bit sequence number that is incremented by one, modulo for each new data frame sent. It is not incremented for retransmitted frames, which are sent with the sequence field set to the frames' original sequence numbers. The sender maintains one sequence for each destination if the sender is sending frames to more than one destination. Upon sending a frame to a given destination, the sender only increments the sequence number for that destination, so that each destination receives sequential frames from each source sending frames to that destination.

The destination can rely on receiving frames of a given priority level from a given sender in sequence, excepting, of course, frames that are lost. If multiple priority levels are not supported, then frames from a given sender are received in order, unless they are lost. Since receipt of a frame out of order indicates the loss of frames prior in the sequence relative to the received frame, the receiver would send nacks for the missed prior frames upon receipt of the received out-of-sequence frame. Since some frame handling systems allow for frame reordering in transit based on differing priorities of frames, the sender preferably uses a separate sequence number for each priority level. So that the receiver can determine the priority of a received frame (which is needed to determine which sequence to check against), a three bit priority field is included in the LARQ header, thus allowing up to eight different levels of priority. In other words, sequence numbers are assigned at a sender per destination and per priority level in order to prevent sequence number inversion problems in networks that allow frames with different priorities to be reordered at a lower layer, such as in the software driver or the hardware portion of the link layer, after the LARQ header has been added.

The maximum size of the payload field of LARQ data frame 102 might need to be reduced by eight bytes to adjust for the LARQ header if the underlying layers cannot handle a frame that is eight bytes longer. For example, in an intermediate driver within Microsoft's MS Win32 stacks, the Maximum Transmission Unit (MTU) for the upper layer could be specified to be shorter than normal. For networks where the physical layer (and its driver) will support frames at least eight bytes larger than the Ethernet maximum of 1518 (1522 for VLAN), the MTU could be left unchanged.

FIG. 7 shows the fields of a LARQ reminder control frame 102', which is similar to LARQ data frame 102, except that the type/length field and the payload fields are not present. The Control field is set to 1 to signal that there is no payload field. If the underlying network requires a minimum frame size, the frame is padded to that minimum size. LARQ control frames are padded to Ethernet (or other physical layer) minimums as necessary, but otherwise are kept as short as possible to minimize network overhead. In Ethernet networks, the minimum frame size is 64 bytes, so the frame would be padded with a pad ranging from zero bytes to the minimum frame size. In some places in this disclosure, a LARQ header size of eight bytes is used by way of example, but other sizes such as seven bytes or six bytes might be used instead.

FIG. 8 shows the fields of a LARQ nack control frame 102". LARQ nack control frame 102" is similar to LARQ reminder control frame 102", except that LARQ nack control frame 102" includes a six byte nack extension field (and consequently, would need to be padded, if at all, by six less bytes). The nack extension field holds the destination MAC address of the original sender. This is the destination MAC address for the frame being nacked. For unicast destinations, this address is the same as the source address of the control frame. For group destinations (multicast/broadcast), this will be the original group address to which the frame was sent. The extra address is required because, when a station sends a frame, it must use its own MAC address as the source address for the frame, as it cannot use a multicast address for protocol reasons. When a multicast frame is received, the frame's destination address is the multicast address, not the station's own MAC address. The original sender needs to know the multicast address that was used for the frame being nacked, and doesn't care about the receiver's MAC address. Further, the LARQ nack must be sent back to the original sender, since there may be multiple senders to the same multicast address, each with its own sequence number space. This is because each combination of source, destination and priority is a separate logical channel and each logical channel has its own sequence number space.

Referring now to FIG. 9, tables maintained by the stations are shown in that figure. Each sender maintains a channel table, such as the channel table 110 shown in FIG. 4 and in further detail in FIG. 9(*a*). Each entry in channel table 110 represents one channel between the sender and a receiver. Other data maintained by senders and receivers are shown in FIGS. 9(b)-(c). If a sender is sending different priority frames to a given receiver, separate logical channels are used.

Using the LARQ frames described above, both LARQ and non-LARQ frames can coexist on an Ethernet network. Each sender notes, in its channel table, whether or not destinations are LARQ-capable. Conventional Ethernet frames are sent unless both the sender and the receiver are LARQ-capable. It is possible to have the entire network be LARQ capable, but that is not necessary. A packet processor can easily distinguish between a LARQ frame and a non-LARQ frame, as explained above.

The handling of nacks will now be described with reference to the flowcharts of the transmission process for LARQ frames (FIG. 10) and the reception process for LARQ frames (FIG. 11), as well as LARQ handler 100 shown in FIG. 4. A basic implementation will be described first, followed by examples of variations applicable to more specific embodiments. The logic of FIGS. 10 and 11 might be performed by sender control logic 104 and receiver control logic 106, respectively, as shown in FIG. 4.

Figure 10:
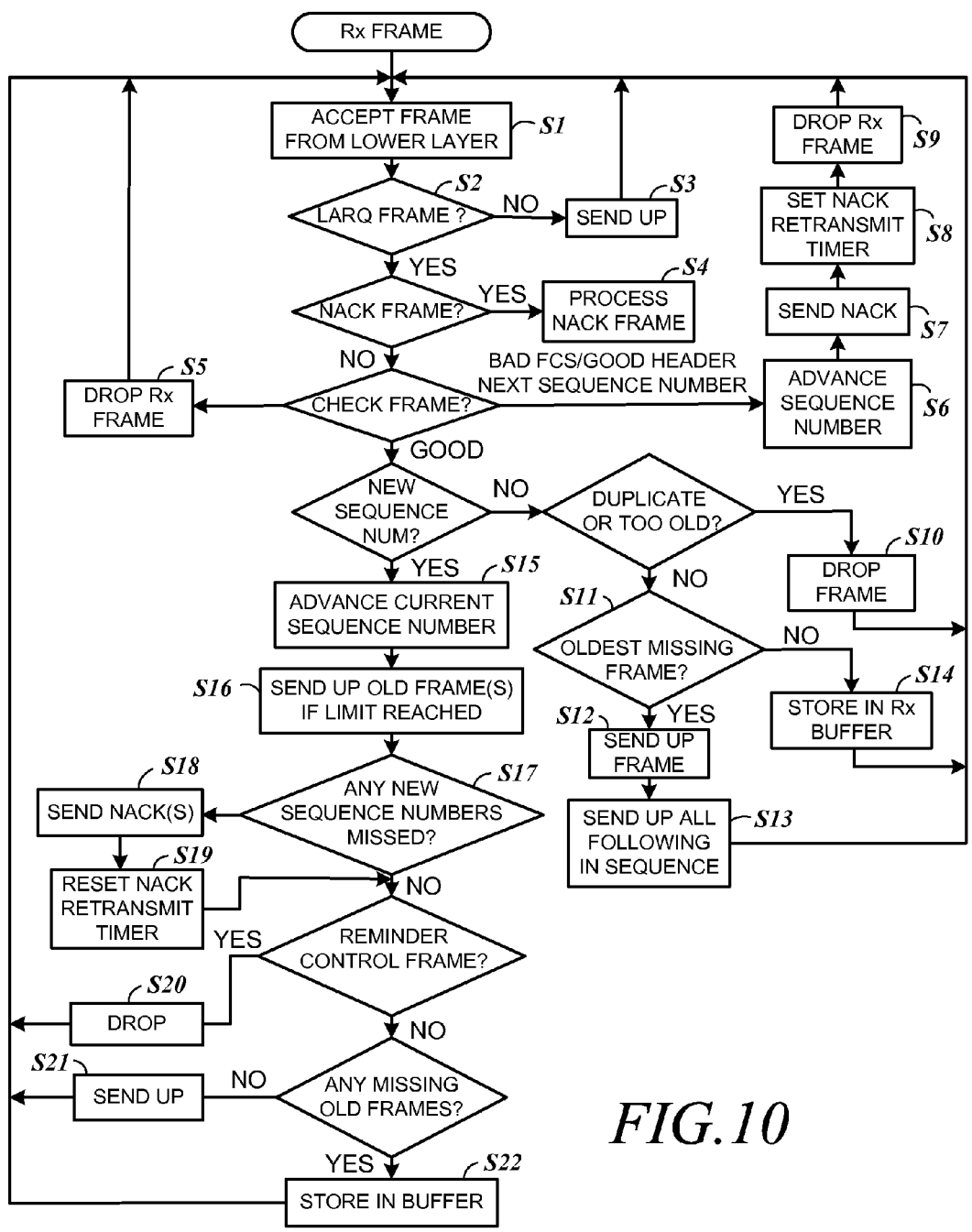
FIG. 10 is a flowchart of a LARQ frame transmission process.
Figure 11:
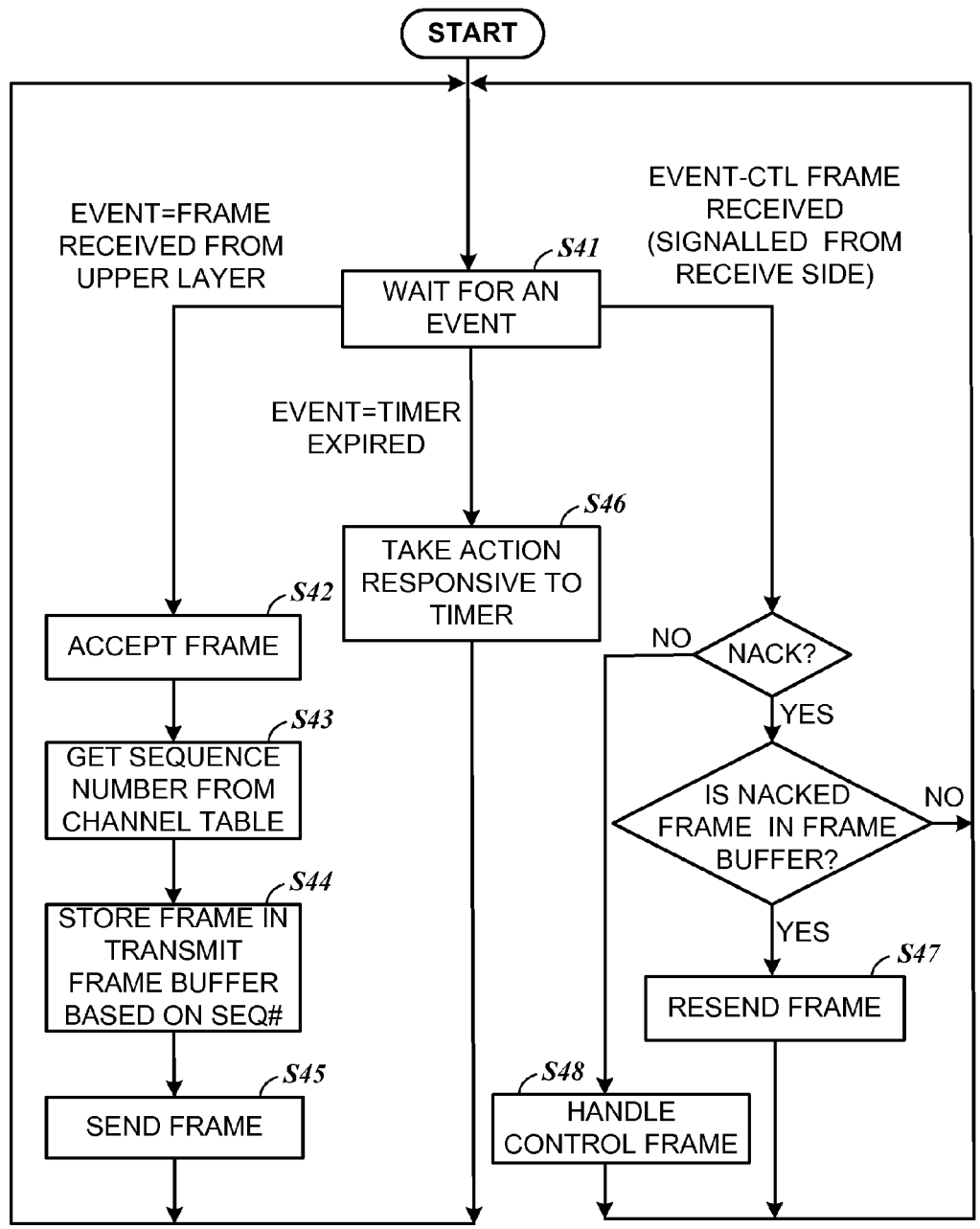
FIG. 11 is a flowchart of a LARQ frame reception process.

The transmission process is shown in FIG. 10. The flowchart shown there omits some peripheral steps, for clarity of what is shown. For example, the flowchart does not address setting up new channels and operates on frames from existing logical channels. It should be apparent from the remainder of this disclosure how a receiver or sender sets up a logical channel and such setup can happen on the fly, i.e., a receiver could set up a logical channel after, and in response to, receiving a frame for a logical channel not already set up at that receiver. It should also be understood that many variations of what is shown in FIG. 10 are possible without affecting the essential steps of the process. For example, the process shown begins in a state where a LARQ handler is waiting to receive a frame from a lower layer and leaves that state when a frame is received. In some variations, not shown, the LARQ handler might leave that state in response to a timer timeout and return to that state after processing a timed event.

The initial state is labeled "S1" in FIG. 10 and subsequent steps from that state are labeled with state or step numbers S2, S3, S4, etc., which are referenced here in the text in parentheses. Once a frame is received from the lower layer, it is checked (step S2) to determine if it is a LARQ frame. If it is not, the frame is sent up to the next layer (S3) and the LARQ handler returns to the initial state S1. If the frame is a LARQ frame, and the frame is a nack frame, it is processed as a nack frame (S4) and the LARQ handler returns to the initial state. At this point, if the frame is not a nack frame, it is checked.

If the frame is bad (e.g., bad header or out of range sequence number), it is dropped (S5) and the LARQ handler returns to the initial state. If the frame has a bad FCS but has a good header and the next sequence number for its logical channel, the sequence number is advanced (S6) and a nack is sent for the current frame (S7). A nack retransmit timer is set for the nacked frame (S8), the current frame is dropped (S9) and the LARQ handler returns to the initial state. If the header is damaged, but the sender and the sequence number are identifiable, a nack might be sent.

If the frame is a LARQ frame and it is a good frame, the sequence number is checked. If the sequence number is not new and the sequence number is too old or duplicates a previously received sequence number, the frame is dropped (S10) and the LARQ handler returns to the initial state. However, if the old sequence number is not a duplicate or too old, the receiver's tables are checked to determine if the current frame is the oldest missing frame (S1). If it is, the current frame is sent up (S12) and all following frames stored in the reorder buffer are sent up as well (S13). If the current frame is not the oldest missing frame, it is stored in the receiver's reorder buffer (S14). In either case, the LARQ handler then returns to the initial state.

If the current frame is good and the sequence is new (has not yet been received for the logical channel), the sequence number for that channel is advanced (S15), old frames are sent up if a limit on frame storage is reached (S16) and the LARQ handler checks to determine if any new sequence numbers are missed (S17). A limit on frame storage might be reached because the sequence number of the current frame might cause the sequence numbers for frames in the reorder buffer to go out of range. Rather than continue to wait for the missing frames missing between the last sent-up frame and the oldest frame in the reorder buffer, those missing frames are declared lost and the oldest frame is sent up. All frames in sequence after that oldest frame up to the next gap in sequence numbers are sent up at this point.

If the next higher layer does not require frames to be delivered in order, the LARQ handler will pass up frames as they are received, rather than storing the out of order frames. However, where the next higher layer requires frames in order, or assumes the loss of frames if they are out of order, the LARQ handler should be configured to buffer frames following a gap for a time in a reorder buffer so that if the receiver can fill the gap with retransmitted frames in time, the frames can be passed to the next layer in sequence order.

If the sequence number of the current frame is not the next in the sequence, it indicates that frames were missed. In particular, the frames with sequence numbers between the last received sequence number and the current sequence number were missed. The LARQ handler sends nacks for those missed frames (S18) and sets nack retransmit timers for those missed frames (S19). As explained below in further detail, if the gap is larger than some threshold, nacks are not sent for all frames in the gap, and the gap is left for the higher layers to handle.

A receiver sends a nack control frame when it detects a missing sequence number from a sender, either due to receipt of a later sequence number or because a payload error prevented delivery of the rest of the payload to the next higher layer. The nack contains the first sequence number of one or more missing frames and a count of the number of missing frames. The nack is a request for retransmission of the indicated original frames. Upon receiving a nack, a sender should immediately retransmit as many of the indicated frames as possible, in their original order.

At this point, the LARQ handler checks the frame to determine if it is a reminder control frame. If it is, the frame is dropped (S20). If not, the frame is sent up if there are no other frames in the reorder buffer (S21), otherwise the current frame is stored in the reorder buffer (S22). The LARQ handler then returns to the initial state.

In some embodiments, if a "receive lost" timer expires (indicating the time for holding frames), the buffered frames are sent to the next higher layer regardless of whether or not there are gaps in the sequence. Thus, the receiver will stop waiting for a frame, declare it lost, and send sequentially following frames up to the next layer. As a frame is sent to the next higher layer, the expected next sequence number for the frame's sender and priority is incremented by one, modulo the size of the sequence number field.

The receive process has now been described. The send process will now be described with reference to the flowchart of FIG. 11. For the send process, the sender waits for an event (S41), such as the receipt of a frame, the expiration of a timer or receipt of a control frame (signaled from the receive side of the LARQ handler). When the sender receives a frame from the layer above, it accepts the frame and adds a LARQ header as described above (S42). The sender references its channel table to determine the next sequence number to use (S43). The sequence number for that channel (specific to a destination and a priority) in the channel table is incremented, modulo the size of the sequence number field (in the above case, modulo 256), prior to the transmission of a new non-control frame. The other fields of the LARQ header are initialized as described above.

The frame is then stored in a transmit buffer (S44) and the reminder timer for that frame is reset. Preferably, the transmit buffer is sized to allow some number of frames to be stored for possible quick retransmission. Preferably, the transmit buffer handles only a limited number of frames, to limit the amount of space required for the transmit buffer. As explained below, a sender might be configured to allow for a maximum number of frames overall (MaxTxSaveCount), a maximum number of frames for any given channel (MaxTxSaveCountChannel) and a maximum time for holding the frame (MaxTxHoldInterval).

The LARQ data frame is then sent to the next lower layer for transmission to the receiver (S45). Since the LARQ header begins with a standard 16-bit Ethertype field assigned by IEEE, non-LARQ receivers will simply discard LARQ data frames as being of an Ethertype unknown to them. In normal operation, LARQ data frames are not sent to non-LARQ receivers, but this discarding of LARQ data frames is used, as described below, to detect whether a new receiver is LARQ-aware or not.

At this point, the sender returns to step S41 and awaits another event. Upon expiration of some timers, the sender takes an action (S46). For example, when the "sendhold" timer expires, frames in the frame buffer older than a predetermined time are removed from the frame buffer. When a "remind" timer expires, a reminder frame is sent. A sending station sends a reminder after a period of inactivity during which no frames have been sent to a recently used destination MAC address and priority. As explained above, the reminder frame contains the sequence number of the sender's most recently transmitted data frame, allowing the receiver(s) to detect lost frames relatively quickly that otherwise might not be missed until much later. Once the timer is dealt with, if no other timers have expired, the sender returns to step S41.

If, at step S41, the sender receives a control frame, signaled by the receive side if the receive and transmit sides of the LARQ handler are separate, the LARQ handler processes the control frame, first checking to determine if the frames is a nack frame. If the control frame is a nack control frame (or a nack indication on a return data frame where piggybacking is used), the sender resends the nacked frames (S47), otherwise, if the control frame is not a nack control frame, the sender deals with the control frame as appropriate (S48). Either way, the sender then returns back to step S1 to await another event. Before resending the nacked frame(s), the sender determines if the nacked frame is available in the transmit buffer. If it is available, the sender resends the frame. Otherwise, the sender takes no action.

If the nacked frame is not retransmitted by the sender, the receiver will eventually stop sending nack requests and consider the frame lost. The receiver will then send any succeeding frames stored in its reorder buffer up to the next higher layer. The error handling processes of those upper levels will likely make a peer-to-peer request among those higher layers for retransmission of the lost frame.

Startup and Reset

When an Ethernet data frame is passed to a LARQ handler for transmission on a new channel (new destination or priority), the sender handles channel initialization in one of two ways. If all stations on the network are known to implement LARQ, or if another channel to the same receiver is already using LARQ, then the sender simply selects a starting sequence number, sets the "type" for that logical channel in the channel table to RECEIVER ("receiver does LARQ"), adds the LARQ header to the frame, and sends it down to the driver. If needed, a new row is added to the channel table.

If the sender does not know whether or not the receiver implements LARQ, the sender sets up the channel with a starting sequence number and a "may not do LARQ" type (as is the case with channel 5 in channel table 110 shown in FIG. 9). The sender then sends the data frame without an LARQ header, and also sends an LARQ reminder frame to the receiver using the destination MAC address and priority of the data frame. Should a nack be received from the receiver, then the type for that channel is set to "receiver does LARQ". If no nack is received after some number of reminder attempts, the channel is marked "receiver does not do LARQ".

When the receiver receives a frame with an LARQ header on a new channel (new source, group destination address, or priority), the receiver initializes channel state information in its receive status table entry for that channel. If the frame is a data frame, the receiver sets up to receive the frame as the next in-order frame for the channel. If the frame is a reminder frame, then the receiver initializes as if it had missed the frame with the sequence number in the reminder, and sends a nack back to the source. This has the effect of letting the sending station know that this receiver also supports LARQ for the channel.

Receivers do not positively acknowledge frames received successfully. Upon detecting a sufficiently large gap in the sequence numbers from a particular sender, a receiver does not nack the frames in the gap, but simply resets its sequence number state for that channel to the current sequence number and leaves the higher layers to deal with the gap. The typical threshold for a sufficiently large gap, in one implementation, is a gap wherein the absolute value of the difference between the new sequence number and the previous most recent sequence number is greater than the maximum number of frames for which the receiver keeps state.

Resource Limits

The sender controls how much data (in frames, bytes, or both) are saved for possible retransmission, and for how long. This allows limits to be set on how late a frame may be retransmitted both in real time and how far out of order it might be when received. The LARQ protocol does not require explicit channel initialization between stations. The receiver also places limits on the time it will hold frames waiting for retransmission of an earlier frame, and the number of frames it will hold. The limits imposed by the sender and receiver need not be identical. If the sender is willing to buffer more than the receiver, then the sender may waste some memory for frames that can never be retransmitted. If the receiver has larger limits, then it may send nack requests for frames that are already unavailable, resulting in some extra control traffic on the network. The basic implementation does not require that the sender buffering is consistent with the receiver buffering, but some implementations might include configuration handshaking, to reduce wasted traffic.

In-order Frame Delivery

Most modem protocols tolerate out-of-order delivery, except for those such as PPP designed exclusively for operation on point-to-point links. However, imperfect and inefficient implementations of higher layer protocols, including both transport and application protocols, make in-order delivery highly desirable. Further, out-of-order delivery is impossible on a normal Ethernet (including bridged multi-segment networks). For many network types, including Ethernet-like networks, a LARQ implementation should preferably deliver successfully received frames in the order originally sent by the sender. While the reordering has been addressed before, some care is required to handle lost frames in a timely fashion if the lost frames are to be transparently replaced with retransmitted frames.

Size and Usage of Sequence Numbers; Old and New Numbers

The size of the sequence number field might be changed, but eight bits appears a good choice for operation over a range of network speeds. Twelve bits is another possibility. At speeds much higher than 10 Mbps, a few tens of frames might be lost during certain kinds of network disruption. It is desirable, for robustness, to have some slack in the sequence number space so that very long disruptions will be detected as large gaps (which in turn cause sequence number resets at the receiver) instead of sequence numbers wrapping around their modulo without detection. To avoid missing notice of the wrap around the modulo, the preferred embodiment targets a sequence number space that can be divided into new numbers, which follow the current number, old numbers which precede the current number and some numbers, designated "out-of-sequence" numbers, which precede the old number and follow the new numbers (which is possibly, since the number space loops back on itself). For example, with a number space of 256 numbers, if the current sequence number is C, numbers C-63 through C might be old numbers, C+1 through C+64 might be new numbers (all modulo 256) and the rest of the numbers would be out-of-sequence numbers.

"New" and "old" numbers are defined with respect to a current receive sequence number. For the sender, the current sequence is the one most recently assigned to a data frame received from the next higher layer for transmission. For the receiver, the current sequence number is the sequence number of the most recently received new frame, or the sequence number of the frame first received when the channel was initialized. Note that the sender and the receiver might have different current numbers at some times.

Formally, an old sequence number is one whose difference from the current sequence number modulo the size of the sequence number space is less than or equal to zero, while a new sequence number is one whose difference from the current sequence number modulo the size of the sequence number space is greater than zero. "Recent" sequence numbers are old sequence numbers close enough to the current sequence number to have saved state information, possibly including a saved copy of a data frame. Beyond the recent sequence numbers are the out-of-sequence numbers, which may not be defined in all versions of the LARQ protocol, but when defined, are those very old or very new sequence numbers that should not be in use by either sender or receiver given the current sequence number.

When a receiver receives a frame with an old sequence number, the frame will be processed as a normal receive frame as long as it does not duplicate a frame already received. A new frame is always processed as a normal receive frame and also results in nacks being sent if one or more previously new sequence numbers are now missing. If an out of sequence number is received, the receiver will simply treat it as a reset of the sequence number space.

If the LARQ handler does not have to deliver frames to the next higher layer in order, then normal receive processing for a non-duplicate data frame, new or old, is to send the frame up to the next higher layer. For in-order delivery, an old frame is sent up the stack if it is the oldest outstanding missing frame, held if there are still older missing frames, or dropped if it is a duplicate. New frames are sent up the stack if there are no earlier, missing frames, or held if there are missing frames with earlier sequence numbers. In addition, advancement of the current receive sequence number moves the range of old sequence numbers, possibly causing old, held, frames to be sent up the stack as they become the oldest outstanding sequence number (e.g. current—63).

Nack Handling and Aggregated Nacks

In the basic implementation, a nack indication which is conveyed to the sender for each missed sequence number, on a per-channel basis. When a Nack control frame is received, the source and destination addresses in the Ethernet header must be reversed in order to perform the channel lookup. A nack control frame should not, by default, cause a new channel to be set up with the original sending station as a receiver. The nack is processed in the context of the sender. The sender normally retransmits all of the indicated frames that are still available, although the MinimumRtxInterval (see below for an explanation of the variables used here) may be applied to prevent too-frequent retransmissions of individual frames.

As an optimization, the Nack control frame includes both a sequence number and a count of missing frames, so that a single Nack control frame may be sent for several, sequential, missing frames. When the number of missing frames exceeds the size of the Nack Count field (three, in the above examples), multiple Nack control frames are sent to request the entire range of missing frames.

Extensions of the Basic Implementation

The basic implementation sends a single reminder for the most recent sequence number after a period of inactivity. An extended implementation might allow for multiple reminders be sent, but there are several reasons why a single reminder, sent after a relatively long interval compared to nacks, appears to be the best choice. The reminder is sent only if there is no further traffic. If a second reminder were sent after a similar interval, the frame might be near the end of its "lifetime" before being dropped as old, making the second reminder even more likely to be useless. Also, the relatively long interval makes it much less likely that a single error event would corrupt both the original frame and the first reminder. The fact that there is no further traffic on the same channel suggests that this is not part of a stream of latency sensitive frames, so allowing a higher layer protocol to take up the slack in the case of a double loss seems a good tradeoff, compared with almost doubling the number of overhead frames on the network.

Nacks, on the other hand, should be resent if there is a good reason to believe that the first nack was unsuccessful. The procedures below are intended to cover this case, ideally through the use of adaptive timeouts to maximize the number of retransmission opportunities.

A basic implementation might not have multiple priorities, in which case, the priority field can be left off of the LARQ header, but the priority field should be used where the lower layers do reorder frames based on a priority.

Group Addresses (Multicast/Broadcast)

The basic implementation can be extended for use with group addresses by defining channel state to be kept for each combination of source, destination and priority, and by extending the nack control frame format. In this extension, the nack control frame includes the original destination MAC address of the frame, since the receiver's own MAC address, used as the source address in the nack control frame, cannot be a group address.

Piggyback Nacks, Fragmentation, Selective Operation, etc.

An extended format header, with two sequence number fields, can be used so that every frame could carry piggy-backed nack indications. This can minimize the number of extra control frames generated by a LARQ handler for bidirectional traffic flows, but with a cost of extra header space for every frame, additional complexity, and some additional latency if nacks are held some brief interval while awaiting a potential data frame on which to get piggybacked.

Other Extensions

Several other extensions of the basic protocol and handler are contemplated. For networks on which longer frames are significantly more likely to be damaged or lost, it is possible to fragment larger frames into two or more segments. Since non-LARQ frames are not normally processed by a LARQ receiver expecting a LARQ frame, it is possible to add LARQ headers only to certain types of frames (perhaps based on protocol or priority). It is also possible to enable LARQ operation only when the error characteristics of the network become worse than some specified threshold.

The basic LARQ protocol can be easily modified, using the teachings herein, for use over almost any type of network that provides a mechanism for defining logical channels if the network supports more than two stations.

Parameter Negotiation

Another possibly useful extension to LARQ is the accommodation of parameter negotiations, or at least configuration announcements. For instance, the reminder and nack frame exchange used to probe and acknowledge the use of LARQ on a new channel can be exploited. The reminder frames can be extended to optionally contain the values of the sender's configuration, and nack frames could optionally contain values for the receiver's configuration. The sender would provide values for the logical channel for MaxTxSaveCountChannel, MaxTxHoldInterval, and MinimumRtxInterval, while the receiver would send MaxRxSaveCountChannel, MaxTxHoldInterval, and RepeatRequestInterval (see below for an explanation of these configuration variables).

A receiver could use these variables to adapt its own per-channel configuration, especially when the sender's resource limits were lower than the receiver's default limits. Also, the MinimumRtxInterval might help prevent wasted nack retransmissions. A sender would also be able to limit the number of saved frames or the time that saved frames could be held to smaller values if the receiver had lower limits.

A Detailed Example

A more detailed specification for a specific embodiment of a LARQ handler in a network supporting the LARQ protocol will now be described.

In this specific embodiment, the LARQ protocol is first defined for a logical channel between a pair of stations with user data in a single direction. The basic logical channel is defined by the tuple comprising the source and destination MAC addresses of the user data frames. An extended definition of the logical channel adds the priority of the user data to the tuple. Although not part of standard Ethernet, priority is available as an extra parameter for frames in Win32 network stacks, and is supported for some network types that use IEEE Ethernet headers, including a phoneline-based network developed by Epigram.

A frame not yet received is declared "missing" if its sequence number is between the most recent known sequence number and the oldest possible sequence number for which the receiver would accept a retransmission. A frame is declared "lost" if it is missing when the receiver decides it must send up a frame with a more recent sequence number, whether due to timing, resource, or sequence numbering limits. If a frame is received after it has been declared lost, it should be discarded.

This specific implementation keeps track of time in units of milliseconds, using a 32-bit millisecond tick counter maintained by the system for time-stamping various events. Timers are implemented by computing the interval (in milliseconds) to the next timer-based event for each logical channel, and calling a WaitForNextEvent function.

TABLE 2

TIME-OUT INTERVAL TIMERS

| Interval | Description |
|---|---|
| $T_{sendHold}$ | The maximum time that transmitted frame [or copy] will be held by a sending station's LARQ handler waiting for possible retransmission. |
| $T_{revLost}$ | The maximum time that a receiver will wait, after detecting a lost (missing or errored) frame, before declaring the frame to be lost. When a frame is declared lost, succeeding frames that were being held awaiting reception of the lost fame can be sent up the stack to the next higher layer. By default, this parameter has the same values as $T_{sendHold}$. |
| $T_{remind}$ | The duration of a period of inactivity after the last data frame transmitted on a channel that must expire before sending a reminder control frame. |
| $T_{minRtx}$ | The minimum time interval between successive retransmissions of the same data frame. If a second request for the same frame is received before this interval has expired, the request will be ignored. This is a function of the smoothed average retransmission request interval seen by the sender for the channel. |
| $T_{request}$ | The interval between successive retransmissions of a nack for missing frame. This is a function of the smoothed average retransmission interval seen by the receiver for the channel. |

The LARQ handler also maintains a set of configuration parameters that control the operation of the LARQ protocol with respect to that LARQ handler. Some of these parameters are shown in Table 3 along with a description and typical value for each configuration parameter.

TABLE 3

CONFIGURATION PARAMETERS

| Parameter | Description | Typical Value |
|---|---|---|
| MaxTxSaveCountChannel | The maximum number of frames that will be held by a sender for a single channel. | 30 |
| MxTxSaveCount | The maximum number of frames That will be held by a sender for all channels. | depends on available memory |

TABLE 3-continued

CONFIGURATION PARAMETERS

| Parameter | Description | Typical Value |
| --- | --- | --- |
| MaxRxSaveCountChannel | The maximum number of frames that will be held by a receiver for a single channel to wait for a missing, but not yet declared lost, frame to arrive. | 30 |
| MaxRxSaveCount | The maximum number of frames that will be held by a receiver for all channels. | depends on available memory |
| MaxProbeCount | The number of reminder probes to be sent before deciding that a receiver does not do LARQ on a particular channel. | 10 |
| MaxTxHoldInterval | The initial value of $T_{sendhold}$. | 150 ms |
| MaxRxHoldInterval | The initial value for $T_{revLost}$. This Is the interval it takes to declare a frame As lost and is also the longest interval That a more recent frame can be held Before it is sent up the stack. | 150 ms |
| ReminderInterval | The initial value for $T_{remind}$. | 50 ms |
| MinimumRtxInterval | The initial value for $T_{mintrx}$. | 10 ms |
| RepeatRequestInterval | The initial value for $T_{request}$. | 25 ms |

A "slow" device with a relatively low maximum frame rate might use a small value for MaxTxSaveCountChannel, such as one or two, while high-speed devices will need much greater values. With a sequence space of 256 sequence numbers and using the above scheme of old, new and invalid sequence numbers, the upper limit for MaxTxSaveCountChannel is 64, since that is one fourth of the sequence number space.

MaxTxSaveCount is preferably a function of MaxTxSaveCountChannel, the number of channels, the maximum data rate of the network, the amount of system memory, etc.

MaxRxSaveCountChannel should be less than or equal to the value of MaxTxSaveCountChannel, and it is possible to use one parameter for control both functions. If a receiver already has MaxRxSaveCountChannel frames stored in its reorder buffer, this limit would be exceeded when a new frame is received. Therefore, if that condition exists, the receiver should send the oldest saved frame up to the next layer and have the missing frames older than the sent up frame declared lost.

MaxProbeCount is the number of reminder probes to be sent before deciding that a receiver does not do LARQ on a particular channel. If the traffic to a receiver is such that MaxProbeCount frames are sent in a quick burst, the sender may quickly conclude that the receiver is not LARQ-enabled, even if it is. To avoid this situation, it may be desirable to add a timeout interval so that only one reminder probe is sent out in each timeout interval.

The following Tables 4-8 set out some information that is maintained for the LARQ processes. Table 4 sets out the information maintained for each channel known to a LARQ layer handler, whether the LARQ layer handler is using the channel as a receiver or a sender. As explained above, each sender-destination-priority permutation has its own logical channel. An example of the data for such a channel state information table is shown in FIG. 9(a). Some of the fields shown in Table 4 are omitted from FIG. 9(a) to keep the illustration a reasonable size.

Table 5 sets out the information maintained for each channel at the sender end of the channel. Table 6 sets out the information maintained for each frame stored by the sending LARQ layer handler. An example of sender data is shown in FIG. 9(b). Table 7 sets out the information maintained for each channel at the receiver end of the channel. Table 8 sets out the state information stored at the receiver for each frame being handled by the LARQ handler. An example of the data for receiver data is shown in FIG. 9(c).

TABLE 4

CHANNEL STATE INFORMATION

| Field | Description |
| --- | --- |
| Channel Identification | A channel number. |
| SenderID | The MAC address of the sending station. |
| DestinationID | The destination MAC address used by the sending station. This is usually the receiving station's MAC address for unicast frames and the destination group MAC address for multicast frames. |
| Priority | The priority of the frame as specified by the sender. |
| Channel Type | A type selected from: UNKNOWNRECEIVER, NORECEIVER, NO SENDER, RECEIVER, SENDER UNKNOWNRECEIVER indicates that the sender does not know if the receiver supports LARQ. Up to MaxProbeCount reminder control frames are sent as probes, one with each frame sent on the channel. If a positive response is received the type is changed to RECEIVER, otherwise the type is changed to NORECEIVER NORECEIVER indicates that the receiver on this channel is not supporting LARQ. NOSENDER indicates that the sender on this channel is not supporting LARQ. Receipt of an LARQ frame causes the type to change to SENDER. RECEIVER indicates that this station is operating as the receiver for the channel. SENDER indicates that this station is operating as the sender for the channel. |
| Cur Seq | The current sequence number for this channel. |
| Oldest Seq | The oldest sequence number for this channel. |
| Frame Table | A reference to a frame table. |
| Probe Count | The number of unsuccessful probes sent to the receiver on a channel in the UNKNOWNRECEIVER type. |

TABLE 5
SENDER CHANNEL STATE INFORMATION

| Field | Description |
|---|---|
| Send Sequence Number | This eight bit field is incremented by one, modulo 256, for each new user data frame to be transmitted to the receiver. The new value is placed in an LARQ header that is inserted into the frame before sending it on to the driver. |
| Retransmission Interval | As implemented, this is a function of a smoothed mean and smoothed mean deviation for retransmission intervals measured from the time a frame was sent to the time it was retransmitted, using dynamic tracking of frame round-trip travel lines. For some implementations this could be a fixed or configurable constant value. The current implementation uses a starting value of 25 milliseconds. |
| SendFrameState [MaxTxSaveCount] | This is an array of size MaxTxSaveCount. State information is kept for each user frame for as many as MaxTxSaveCount sequence numbers. The state information may include, for each frame, a copy of the frame as well as the fields shown in Table 6. |

TABLE 6
SENDER FRAME STATE INFORMATION

| Field | Description |
|---|---|
| TxFrameFlag | 1 = have saved frame, 0 = no saved frame. This field could be an implicit field, where only saved frames are listed in the table. |
| Retransmission Flag | 1 = retransmitted at least once, 0 = not yet resent. This field might not be explicit; it could be implicitly determined from Retransmit Time. |
| Send Frame | If TxFrameFlag is 1, this field is a copy of the frame that can be used for retransmission. This may be a pointer to frame data. |
| Send Time | The time at which the frame was originally sent. |
| Retransmit Time | The time when the frame was retransmitted, valid only if Retransmission Flag is 1. |

TABLE 7
RECEIVER CHANNEL STATE INFORMATION

| Field | Description |
|---|---|
| Receive Sequence Number | The most recent sequence number received on the logical channel. |
| Mean Request Interval | As implemented, this is a function of a smoothed mean and smoothed mean deviation for retransmission intervals measured from the time the frame was missed to the time the retransmitted frame was received. For some implementations, this could be a fixed or configurable constant value. A typical starting value is 25 milliseconds. |
| ReceiveFrameTable [MaxRxSaveCnt] | This is an array of size MaxRxSaveCnt. State information is kept for each frame for as many as MaxRxSaveCnt sequence numbers. The state information may include, for each frame, a copy of the frame as well as the fields shown in Table 8. |

TABLE 8
RECEIVER FRAME STATE INFORMATION

| Field | Description |
|---|---|
| Received Flag | 1 = a good frame was received, 0 = frame not received (either at all, or it was errored). This field might be implicit, if only good frames are stored in the table. |
| RxFrame Flag | 1 = frame is being held, 0 = no frame being held. |
| Rx Lost Flag | 1 = sequence number was timed out and higher numbered frames are no longer held for it, 0 = frame not declared "lost". |
| Receive Frame | If RxFrame Flag is 1, this field is the frame that is being held (or a pointer to frame data), waiting to be sent up to the next layer. |
| Miss Time | The time the frame was first missed (i.e., when a higher numbered frame was received, or an encored copy of the frame was received). This field is used for computing the average retransmission interval from the receiver's perspective. |
| Nack Req Time | The time that the last nack request was generated. Used for generating the next retransmission request timeout. |
| Receive Time | The time that the frame was received (time stamp). |

The first three or four fields of receiver frame state information could be explicit or could be implicitly determined from the time stamp (Receive Time). An example of a communication session using the above tables and parameters will now be described.

Channel Initialization

To begin communications between one sender and one receiver, a logical channel is initialized. The only explicit control communication needed between senders and receivers can be handled using nack indications. When a sender first uses a new destination/priority, the sender's LARQ module sets up a new logical channel and assigns an initial sequence number for the first frame. All timers are initially disabled, the list of saved frames for the new channel is cleared, channel parameters are initialized to their default values, and other state information (counters, etc.) is appropriately initialized.

If the receiver is known to implement LARQ, then the type of the channel is set to SENDER. Otherwise, the channel type is set to UNKNOWNRECEIVER. At this point, the sender sends a reminder control frame to the receiver and the channel variable ProbeCount (initialized to 0) is incremented (to 1).

When a receiver first receives a frame with an LARQ header for a new channel, where a new channel is any communication for a new source, from a new destination or with a new priority, the receiver sets up a new logical channel. The list of held frames for that new channel is cleared, if needed, as are all counters and similar state variables for that channel, and channel configuration parameters are set to their initial values. The state is initialized to accept the new frame as the next in-sequence frame by setting the Receive Sequence Number to the sequence number preceding that in the new frame, and marking all sequence numbers for which state is maintained as received.

A receiver may find a new sequence number from a source to be way out of sequence, either due to many lost frames or a reset by the sender. In this case, the receiver simply sends up all saved frames and resets its channel state as if the new sequence number were the first from the source on the logical channel. However, statistics counters for the channel are not reset.

Following the probe, the sender begins sending data frames.

Sending a Data Frame

In an Ethernet network, LARQ is implemented as a protocol layer between the Ethernet link layer and the Ethernet network driver. Thus, Ethernet frames that are ready for transmission onto the network pass through the LARQ protocol layer. When a LARQ transmit module receives an Ethernet frame for transmission, it checks its channel table to determine if the frame is destined for a logical channel that already exists and is of type SENDER. Otherwise, a new channel is initialized as described above.

If the channel already exists, the Send Sequence Number for the channel is incremented, and its new value is included in an LARQ header inserted into the frame immediately following the source MAC address field. The Priority field is set to the priority specified by the next higher layer, or zero if the sender does not use priorities. The Control Flag is set to zero, as are other unused fields in the LARQ header. The frame is then passed down to the driver for normal transmission. The time that the frame was first transmitted is recorded. A logical timer is started, set for the interval T.sub.sendHold, whose expiration will cause the save frame to be released, unless the timer was halted due to early release of the frame for other reasons. A logical reminder timer, described in the next section, is also (re)started.

If the sender's channel type is NORECEIVER for the channel matching the new to be sent, the frame is sent to the lower layer driver unchanged (without an LARQ header).

When the type is UNKNOWNRECEIVER, the new data frame is sent unchanged, but the sender also checks the Probe Count parameter for the channel. If Probe Count is less than MaxProbeCount, the sender sends a reminder control frame with the channel's destination and priority (without incrementing the initial value of the Send Sequence Number), and increments Probe Count. If Probe Count has reached its limit, the channel's type is changed to NORECEIVER.

Reminder Control Frame Generation

In order to protect individual frames or those that are the last in a series, a short reminder control frame is sent after an interval has passed with no further frames to be transmitted. The reminder control frame contains the sequence number of the most recently transmitted frame, Send Sequence Number, so that a receiver can detect the frame's loss and send a nack. The logical implementation for this function uses a timer that is set to T.sub.remind and is started each time a new frame is transmitted on a channel. Expiration of the timer causes a reminder control frame to be transmitted. The timer can either be restarted after expiration of the timer, or in some embodiments, the timer is not restarted until the next frame is sent.

Handling Nacks and Retransmissions

When a nack control frame is received, the source and destination addresses in the Ethernet header are logically reversed in order to perform the channel lookup. The nack is processed in the context of the sender. A nack control frame should not be used to cause a new channel to be set up with the original sending station as a receiver, because the only sequence number in the LARQ header applies to the original sender's channel. The sender normally retransmits all of the indicated frames that are still available, although the MinimumRtxInterval may be applied to prevent too-frequent retransmissions of individual frames.

When a nack has been received, each of the indicated sequence numbers is processed, from oldest to newest. If the sequence number is recent and the frame is still available, the sender checks whether the frame has been retransmitted at all (Retransmission Flag). If not, the frame is immediately retransmitted, the Retransmission Flag is set, and a timestamp of the retransmission time for the frame is stored. Some implementations may update statistics on the interval between the original sending of the frames and retransmissions. If the frame had previously been retransmitted, then the interval from its previous retransmission to the present is computed and compared with Retransmission Interval. If too little time has elapsed, then the frame is not retransmitted, otherwise the frame is retransmitted and its retransmission timestamp is updated.

Reception of Frames

Received frames with the LARQ Ethertype are processed by the LARQ protocol module. Nack control frames are handled independently from other received LARQ frames, as described above. LARQ data frames and reminder control frames are handled in a similar manner to each other since most of the complex processing involves management of sequence number state. When the LARQ module has determined that a frame should be sent up to the next higher layer, the LARQ header is removed so that the Ethernet source and destination MAC addresses are once again contiguous with the original Ethernet Type/Length field, and the frame is passed up. Frame handling depends both on the sequence number of the received frame and on the state of recent sequence numbers. Some implementations may choose not to implement in-sequence delivery of frames to the next higher layer, in which case the handling of the actual receive frames is much simpler, since no buffering is required.

If the received frame's sequence number is not out-of-sequence but not recent (older than MaxRxSaveCount from the current Receive Sequence Number), it is dropped with suitable statistics gathering. If the received frame's sequence number is recent (within MaxRxSaveCount of Receive Sequence Number) but has already been marked as received or lost, it is dropped with suitable statistics. If not dropped, a received frame with a recent sequence number will be marked as received. The receiver may compute statistics on the time taken to receive a retransmitted frame from when it was first missed in order to support adaptive retransmission of nacks.

Then, if reordering is not implemented, the frame will be sent up to the next higher layer. If frames are being reordered and the received frame does not have the oldest missing sequence number, the frame is saved, and the RxFrame Flag for its sequence number is set to 1. If the received frame has the oldest missing sequence number, the frame is sent up to the next higher layer, along with any further, in-sequence, saved frames. As saved frames are sent up, the RxFrame Flag for each is set to 0.

If a received frame's sequence number (not a Nack control frame) is new and within a window of MaxRxSaveCountChannel from Receive Sequence Number, the receiver will update its state by advancing the window of recent sequence numbers until the received frame's sequence number is current. If the received frame's new sequence number was outside of the valid sequence numbers, the sequence number should have been treated as out-of-sequence, and the channel reset function performed so that the new frame will be in-sequence.

The Receive Sequence Number is repeatedly incremented by 1 (modulo 256, or other size of the sequence space) until it is equal to the received frame's sequence number. Each time it is updated, the state of the new current sequence number is initialized as missing and the time when it was first missed is recorded, unless the current number is that of the receive frame and the receive frame was a valid data frame (not a reminder and not errored). If the frame is marked received, it is also saved, possibly temporarily. For each new sequence number, the trailing edge of the sliding window of recent sequence numbers also changes. The new oldest recent sequence number is checked to see there is a held frame. If there is a saved frame (Rx Frame Flag=1), that frame is sent up to next higher layer and Rx Frame Flag is set to 0. When the current sequence number has been fully updated to the received sequence number, the receiver then scans the history of recent frames, starting with the oldest sequence number not yet lost or sent up. If that sequence number has a held frame, then that frame and any in-sequence held frames that follow it are sent up to the next higher layer. This will result in the just-received frame to be sent up to the next higher layer, if appropriate.

Lost Frame Timeouts

At the time a missed sequence number was first noted, a timestamp was recorded. Logically, a timer with value T.sub-.rcvLost was started for that sequence number. If the frame is received then the timer is (logically) stopped. If the frame is never received and the timer expires, then the sequence number is marked lost (Rx Lost Flag=1). When a sequence number is marked lost, the next higher sequence number is checked to see if a held frame is present. If so, the held frame (now the oldest, not yet sent up, frame) is sent up to the next higher layer, along with any in-sequence held frames that follow it.

Figure 12:
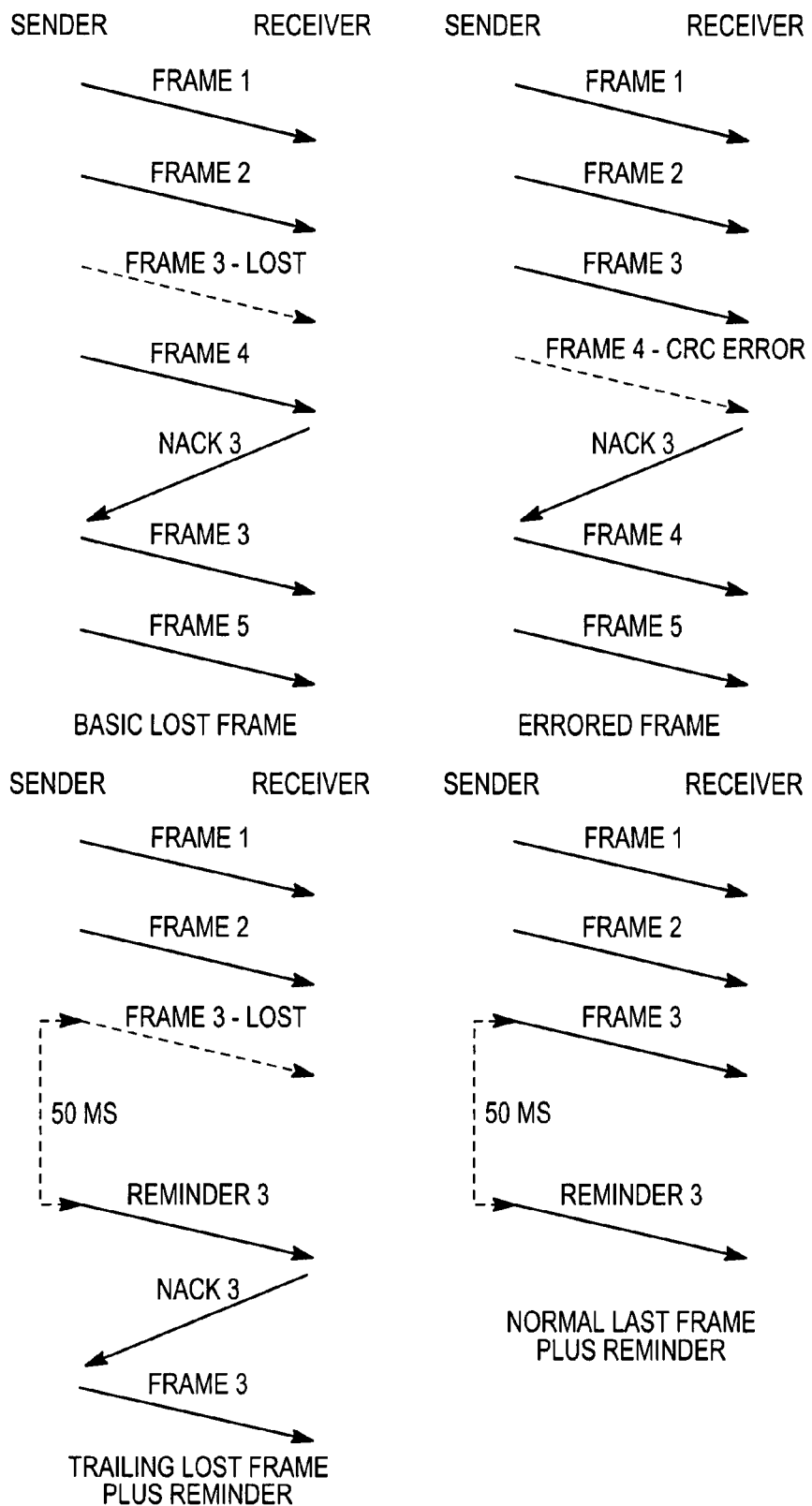
FIG. 12 is a frame flow diagram illustrating several examples of a frame handling process performed between a sender and receiver.
Figure 13:
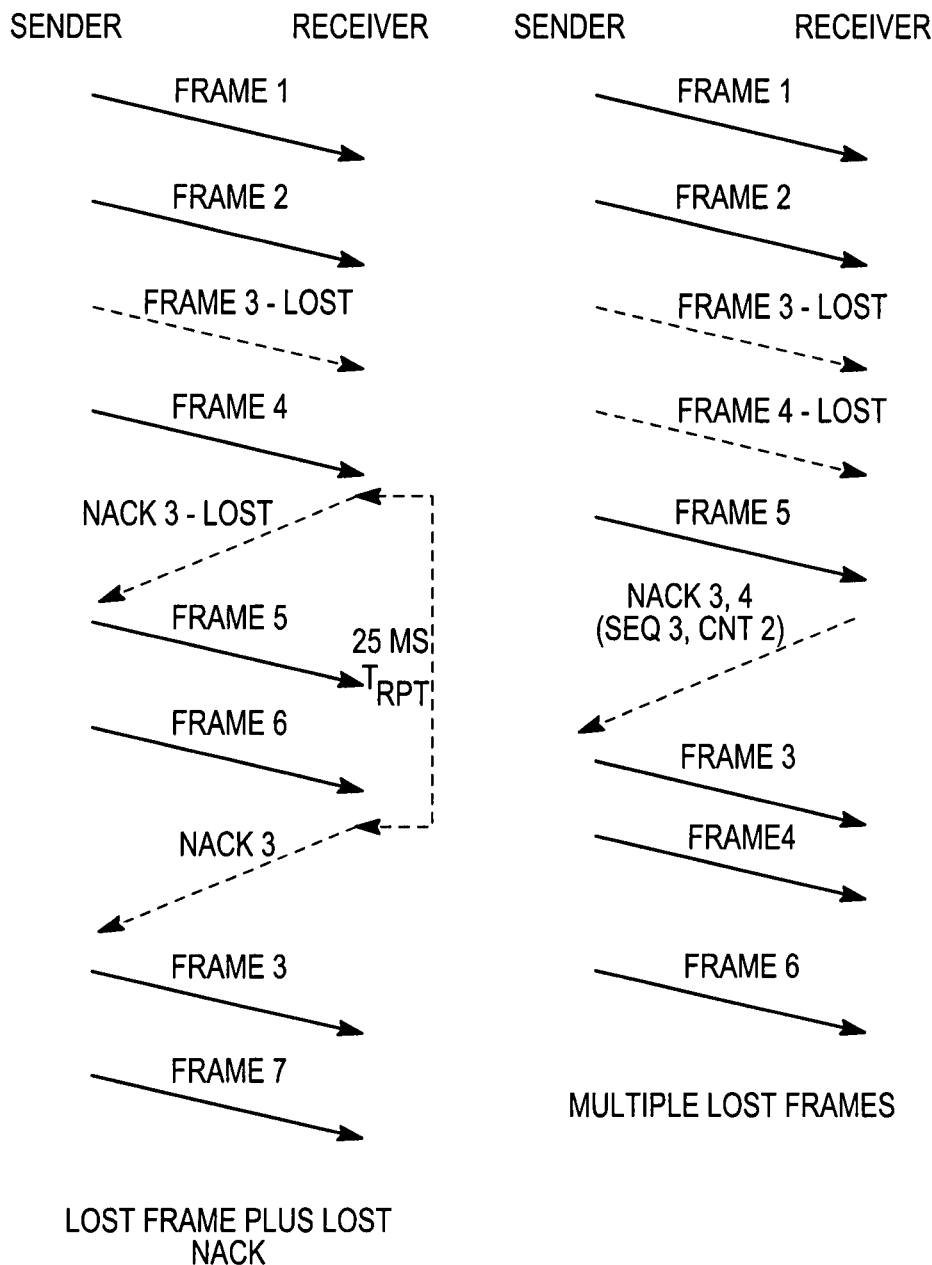
FIG. 13 is a frame flow diagram illustrating several additional examples of a frame handling process performed between the sender and receiver.

The above-described processes repeat as long as the channel remains open. FIGS. 12-13 show examples of how LARQ frames might be handled.

Figure 14:
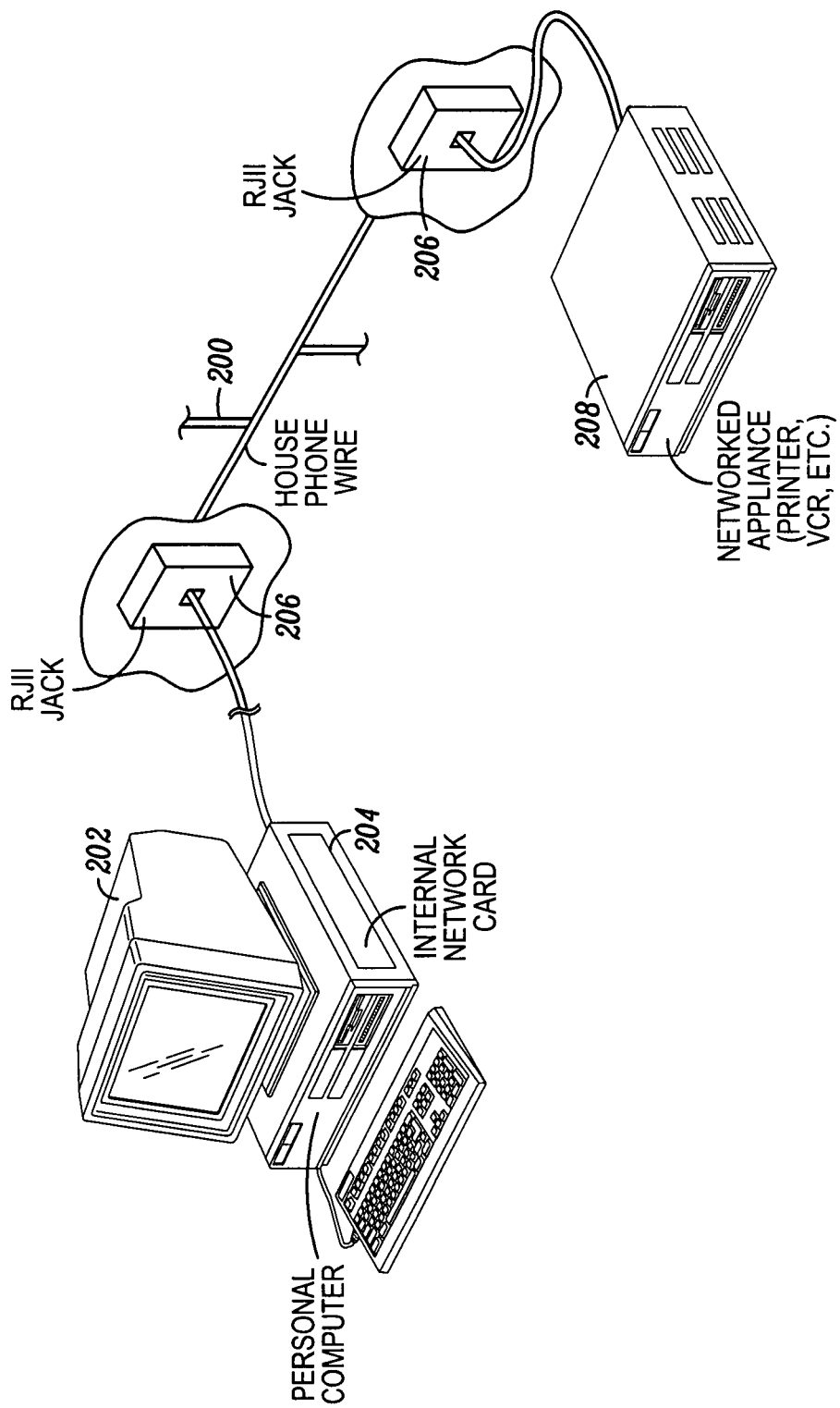
FIG. 14 is an illustration of one application of the frame-switched network of the present invention over a potentially unreliable channel.

FIG. 14 shows a typical network 200 where the present invention might be used. As shown in FIG. 14, network 200 uses existing residential telephone wiring to form a network. A personal computer 202 contains a network card 204 that connects to network 200 via a connection to an RJ-11 jack 206. Other network devices, such as a networked appliance 208 (a printer, VCR, environmental controller, or the like), might also be coupled to network 200 in a similar manner. Using the LARQ protocol, the devices connected to network 200 could communicate at higher effective data rates than if LARQ were not used.

The above description is illustrative and not restrictive. Many variations of the invention will become apparent to those of skill in the art upon review of this disclosure. Merely by way of example, the above description described modifications to an Ethernet network to support the LARQ protocol, but the LARQ protocol is not limited to such a network and can be easily modified, using the teachings of this disclosure, to operate over other network types. The scope of the invention should, therefore, be determined not with reference to the above description, but instead should be determined with reference to the appended claims along with their full scope of equivalents.

What is claimed is:

1. An apparatus including a processing circuit at a send station, the processing circuit configured to:
   generate a data frame at the send station in a network;
   store a copy of the data frame in a transmit buffer at the send station;
   send the data frame from the send station to a receive station;
   reset a reminder timer in response to sending the data frame, the reminder timer being configured to be reset for each data frame sent from the send station to the receive station;
   determine, based on expiration of the reminder timer, a period of inactivity that exceeds a threshold during which no further data frames are sent from the send station to the receive station; and
   send, in response to the determining, a reminder control frame to the receive station identifying a last data frame transmitted from the send station to the receive station, wherein the reminder control frame does not include a payload field.

2. The apparatus of claim 1 wherein the generated data frame includes a sequence number to identify the data frame.

3. The apparatus of claim 1 wherein the processing circuit is further configured to:
   assign sequence numbers to respective data frames per destination or receive station and per priority level; and
   include the assigned sequence numbers in the respective data frames.

4. The apparatus of claim 1 wherein the processing circuit is further configured to:
   receive at the send station a negative acknowledgement (NACK) from the receive station indicating that one or more transmitted data frames from the send station were not received by the receive station; and
   re-send, in response to receiving the NACK, the one or more indicated data frames from the send station to the receive station.

5. The apparatus of claim 1 wherein the processing circuit is further configured to:
   discard the copy of the data frame if a resource constraint at the send station is met.

6. The apparatus of claim 1 wherein the processing circuit is further configured to determine that the period of inactivity exceeds the threshold during which no further data frames are sent from the send station to a media access control (MAC) address of the receive station.

7. An apparatus including a processing circuit at a send station, the processing circuit configured to:
   generate a data frame at the send station in a network;
   store a copy of the data frame in a transmit buffer at the send station;
   send the data frame from the send station to a receive station;
   reset a reminder timer in response to sending the data frame, the reminder timer being configured to be reset for each data frame sent from the send station to the receive station;
   determine, based on expiration of the reminder timer, a period of inactivity that exceeds a threshold during which no further data frames are sent from the send station to the receive station; and
   send, in response to the determining, a reminder control frame to the receive station identifying a last data frame transmitted from the send station to the receive station, wherein the reminder control frame is sent by the send station without receiving a request from the receive station to retransmit the last data frame.

8. The apparatus of claim 7 wherein the generated data frame includes a sequence number to identify the data frame.

9. The apparatus of claim 7 wherein the processing circuit is further configured to:
   assign sequence numbers to respective data frames per destination or receive station and per priority level; and
   include the assigned sequence numbers in the respective data frames.

10. The apparatus of claim 7 wherein the processing circuit is further configured to:
    receive at the send station a negative acknowledgement (NACK) from the receive station indicating that one or more transmitted data frames from the send station were not received by the receive station; and
    re-send, in response to receiving the NACK, the one or more indicated data frames from the send station to the receive station.

11. The apparatus of claim 7 wherein the processing circuit is further configured to:
    discard the copy of the data frame if a resource constraint at the send station is met.

12. The apparatus of claim 7 wherein the processing circuit is further configured to determine that the period of inactivity exceeds the threshold during which no further data frames are sent from the send station to a media access control (MAC) address of the receive station.

* * * * *